US012744761B2

(12) United States Patent
Pathak et al.

(10) Patent No.: US 12,744,761 B2
(45) Date of Patent: Sep. 22, 2026

(54) ADAPTIVE RATE LIMITER BASED ON TRANSACTIONAL HEURISTICS AND ARTIFICIAL INTELLIGENCE

(71) Applicant: Palo Alto Networks, Inc., Santa Clara, CA (US)

(72) Inventors: Manish Pathak, Milpitas, CA (US); Krishna Murthy Pokuri, Sunnyvale, CA (US); Parush Gera, Tampa, FL (US); Sankar muthu Paramasivam, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 47 days.

(21) Appl. No.: 18/416,765

(22) Filed: Jan. 18, 2024

(65) Prior Publication Data

US 2025/0240277 A1 Jul. 24, 2025

(51) Int. Cl.
*H04L 9/40* (2022.01)
*G06N 20/00* (2019.01)

(52) U.S. Cl.
CPC ......... *H04L 63/0281* (2013.01); *G06N 20/00* (2019.01); *H04L 63/0236* (2013.01); *H04L 63/0884* (2013.01); *H04L 63/1458* (2013.01)

(58) Field of Classification Search
CPC ............. H04L 63/0281; H04L 63/0236; H04L 63/0884; H04L 63/1458; G06N 20/00
See application file for complete search history.

(56) References Cited

U.S. PATENT DOCUMENTS 9,262,642 B1 * 2/2016 Roth ........................ G06F 21/45
10,924,590 B1 * 2/2021 Zhang .................... G06N 20/00
11,032,280 B1 * 6/2021 Chhabra ............. H04L 63/0884
11,138,192 B1 * 10/2021 Chintala ............. H04L 63/0846
11,163,537 B1 * 11/2021 Grimson ................. G06F 9/542
11,206,179 B1 * 12/2021 Rathore .............. H04L 63/0807
11,240,469 B1 * 2/2022 Schoenborn ........... H04R 1/403
11,297,152 B1 * 4/2022 Stalioraitis .............. H04L 67/52
11,757,946 B1 * 9/2023 Shemesh ............... H04L 43/026
12,445,470 B2 * 10/2025 Yadav-Ranjan .... H04L 63/1458
2005/0108551 A1 * 5/2005 Toomey ................ H04L 9/3297 713/185
2010/0095351 A1 * 4/2010 Liu ..................... H04L 63/1458 726/23
2011/0105154 A1 * 5/2011 Kim ........................ H04W 4/50 455/458
2014/0223537 A1 * 8/2014 Islam ..................... H04L 63/20 726/12
2014/0325588 A1 * 10/2014 Jalan ................... H04L 63/1466 726/1
2017/0019396 A1 * 1/2017 Bettenburg .......... G06K 7/1417
2023/0422038 A1 * 12/2023 Kolekar .............. H04W 12/122
2024/0039938 A1 * 2/2024 Yadav-Ranjan .... H04L 63/1425
2024/0276177 A1 * 8/2024 Hanuska ............. H04W 12/084
2024/0323226 A1 * 9/2024 Pullen, III .......... G06F 21/6272
2025/0097261 A1 * 3/2025 Rozenbaum ............ H04L 41/16

* cited by examiner

*Primary Examiner* — Javier O Guzman
(74) *Attorney, Agent, or Firm* — Van Pelt, Yi & James LLP

(57) ABSTRACT

A system, method, and device for adaptively limiting web requests is disclosed. The method includes (i) receiving a request at a proxy for an authentication service, (ii) determining whether the request is trusted based at least in part on a classification obtained from a classifier, and (iii) handling the request according to a determination of whether the request is trusted.

25 Claims, 13 Drawing Sheets

1100

ADAPTIVE RATE LIMITER BASED ON TRANSACTIONAL HEURISTICS AND ARTIFICIAL INTELLIGENCE

BACKGROUND OF THE INVENTION

Authentication services play a critical role in securing digital systems and applications by verifying the identity of users attempting to access protected resources. However, the increasing prevalence of DDOS attacks poses a significant threat to the availability and reliability of these authentication services. DDOS attacks involve overwhelming a target system with a flood of malicious requests, rendering it incapable of responding to legitimate user authentication requests.

BRIEF DESCRIPTION OF THE DRA WINGS

Various embodiments of the invention are disclosed in the following detailed description and the accompanying drawings.

DETAILED DESCRIPTION

Figure 1:
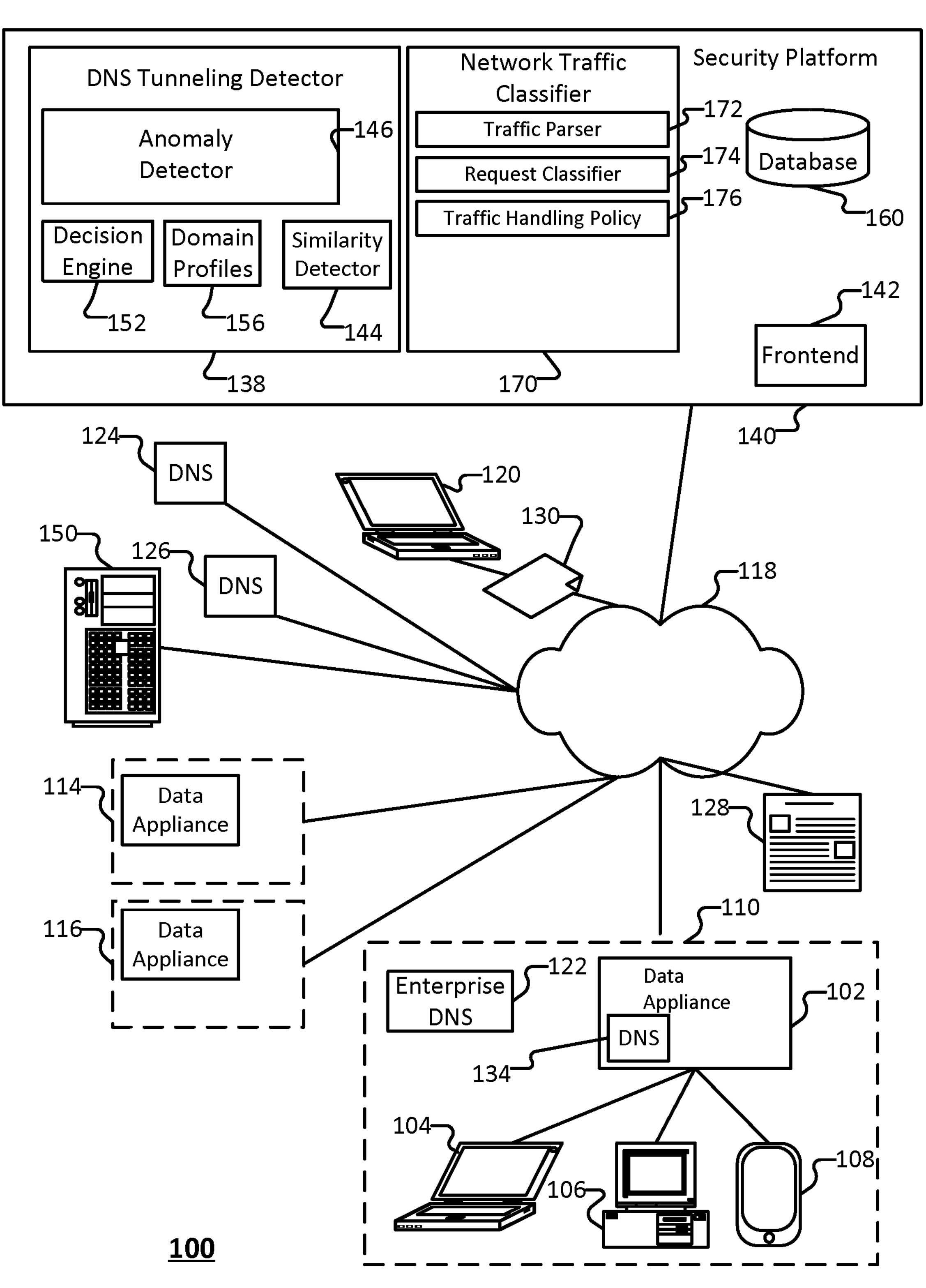
FIG. 1 is a block diagram of an environment for detecting malicious authentication requests according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present invention relates to the field of cybersecurity and, more specifically, addresses the challenges associated with distributed denial of service (DDOS) attacks on authentication services. The invention provides a novel system and method for limiting requests to an authentication service, thereby safeguarding against DDOS attacks and ensuring the uninterrupted and secure operation of authentication processes.

Existing solutions for mitigating DDOS attacks often focus on network-level defenses, which may not be tailored to the unique challenges posed by authentication services. Moreover, traditional DDOS mitigation strategies can inadvertently impede the efficiency and responsiveness of legitimate authentication requests. Related art systems generally used fixed-rate limiting such as to block requests from a specific IP address if a number of requests from the specific IP address exceeds a predefined request threshold. The related art systems thus are static solutions and are not dynamic or adaptive to a particular context of the requests.

According to various embodiments, the system employs dynamic algorithms to adaptively adjust the rate at which authentication requests are processed based on real-time traffic analysis. This enables the system to differentiate between legitimate user requests and malicious DDOS traffic.

In some embodiments, the system incorporates behavioral analysis techniques to identify anomalous patterns in authentication requests. By continuously monitoring user behavior, the system can dynamically adjust request limits and detect potential DDOS attack patterns. For example, the system determines whether the user or the particular requesting system/service returns credentials to an authentication service in connection with an authentication request.

The system can leverage machine learning (ML) models to enhance its ability to recognize and differentiate between normal and malicious authentication requests. For example, the system implements an ML model that is trained based on attributes for a set of requests and an indication of whether the set of requests were valid (e.g., the requesting system/service returned authentication credentials or otherwise completed the authentication) or invalid (e.g., the requesting system/service did not provide authentication credentials or complete the authentication). This adaptive learning capability improves the system's effectiveness in responding to evolving DDOS attack strategies.

The adaptive classification of requests enables the system to intelligently allocates computational resources to prioritize processing of legitimate authentication requests during periods of high traffic, ensuring that the authentication service remains responsive even under DDOS attack conditions.

Various embodiments provide a system, method, and device for adaptively limiting web requests. The method includes (i) receiving a request at a proxy for an authentication service, (ii) determining whether the request is trusted based at least in part on a classification obtained from a classifier, and (iii) handling the request according to a determination of whether the request is trusted.

Various embodiments provide a system, method, and device for training a classifier for adaptively limiting web requests. The method includes (i) obtaining a set of requests at a proxy for an authentication service, (ii) training a classifier based at least in part on the set of requests, wherein the classifier is configured to identify legitimate requests to the proxy for the authentication service, (iii) deploying the classifier in connection with adaptively limiting requests to the proxy for the authentication service.

FIG. 1 is a block diagram of an environment for detecting malicious authentication requests according to various embodiments. In some embodiments, system 100 is implemented at least in part of system 200 of FIG. 2 and/or system 500 of FIG. 5. System 100 may implement one or more of processes 700-1200 of FIGS. 7-12, respectively.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains or parked domains, or traffic for certain applications (e.g., SaaS applications), or malicious or invalid authentication requests. In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including (i) managing/maintaining a security policy configuration(s) for enterprise network 110 and/or devices connected to enterprise network 110 (e.g., managed devices, security entities, etc.), (ii) enforcing the security policy configuration or causing a security entity (e.g., a firewall) to enforce the security policy configuration, (iii) classifying network traffic, (iv) classifying authentication requests, (v) determining a manner by which authentication requests are to be handled (e.g., based at least in part on a predicted authentication classification, etc.), (vi) training a machine learning (ML) model to generate predictions with respect to authentication request classifications, and/or (vii) performing an active measure with respect to network traffic (e.g., authentication requests) or files communicated across the network based on an instruction from another service or system or based on security platform 140 using a classifier (e.g., an ML model, a rule-based model, etc.) to generate a prediction with respect to the network traffic (e.g., a prediction of whether the network traffic, or session data for a particular traffic protocol, is malicious).

Security platform 140 may implement other services, such as determining an attribution of network traffic to a particular DNS tunneling campaign or tool, indexing features or other DNS-activity information with respect to particular campaigns or tools (or as unknown), classifying network traffic (e.g., identifying application(s) to which particular samples of network traffic corresponding, determining whether traffic is malicious, detecting malicious traffic, detecting C2 traffic, etc.), providing a mapping of signatures to certain traffic (e.g., a type of C2 traffic,) or a mapping of signatures to applications/application identifiers (e.g., network traffic signatures to application identifiers), providing a mapping of IP addresses to certain traffic (e.g., traffic to/from a client device for which C2 traffic has been detected, or for which security platform 140 identifies as being benign), performing static and dynamic analysis on malware samples, assessing maliciousness of domains, determining whether domains are parked domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), determining and/or providing an indication or a likelihood that authentication request is malicious, determining and/or providing an indication or a likelihood that network traffic for a particular traffic protocol (e.g., HTTP session data) is malicious, determining a model score, providing/updating a whitelist of input strings, files, domains, source addresses, destination address, authentication requests, or other characteristics or attributes of network traffic deemed to be benign, providing/updating input strings, files, domains, source addresses, destination address, authentication requests, or other characteristics or attributes of network traffic deemed to be malicious, identifying malicious input strings, detecting malicious input strings, detecting malicious files, predicting whether input strings, files, or domains are malicious, and providing an indication that an input string, file, or domain is malicious (or benign).

In some embodiments, network traffic classifier 170 classifies network traffic, such as to determine whether the traffic is malicious or benign, or to determine a likelihood that the traffic is malicious or benign. Network traffic classifier 170 can store one or more classifiers (e.g., rule-based models, machine learning models, etc.). For example, network traffic classifier 170 implements a classifier for predicting whether authentication requests (e.g., received from a proxy or client device) are malicious/benign. Network traffic classifier 170 can further store/implement one or more security policies, such as a traffic-handling policy, according to which network traffic classifier 170 causes the network traffic (e.g., the authentication requests) to be handled.

In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, network traffic classifier 170 is implemented as a proxy to an authentication service such as to mediate traffic to the authentication service and prevent the authentication service from being overwhelmed by a denial of service campaign.

In some embodiments, network traffic classifier 170 maintains/manages one or more security policy configurations, such as firewall rules or traffic handling policies. In the example shown, network traffic classifier 170 comprises traffic parser 172, request classifier 174, and/or traffic handling policy 176. Network traffic classifier 170 can receive network data, such as authentication requests to authenticate a user or device for a web service. In some embodiments, network traffic classifier 170 receives the network data in connection with processing a request from a client system or other security entity (e.g., a firewall) for a network traffic classification. In response to receiving the authentication request and/or the request to perform an authentication request classification, network traffic classifier 170 parses the authentication (e.g., to obtain information pertaining to the various session data, such as source-destination information, or other attributes for the authentication requests, etc.), obtains an authentication request classification (e.g., by querying a classifier), and provides the authentication request classification or causes the authentication request to be handled according to the authentication request classification.

Network traffic classifier 170 can use traffic parser 172 to parse a network traffic, such as session data (e.g., the authentication requests intended for an authentication service). Traffic parser 172 can analyze the authentication request to obtain various attributes associated with the authentication request, such as source information, destination information, and other information/metadata information for session data (e.g., information comprised in a header).

Network traffic classifier 170 can use request classifier 174 to determine (e.g., generate) a classification (e.g., an authentication request classification) for the authentication request. For example, request classifier 174 comprises a classifier(s), which may comprise a rule-based classifier/model and/or machine learning-based classifier/model.

Network traffic classifier 170 can use traffic handling policy 176 to store and/or maintain security policies. An example of the security policy is a traffic handling policy, such as firewall rules. Traffic handling policy 176 may enforce one or more security policies based at least in part on network traffic classification, such as the correlated network traffic classification (e.g., the second-layer classification). Additionally, or alternatively, traffic handling policy 176 may cause one or more security policies to be enforced by another system or device, such as a client system or a security entity (e.g., a firewall). In some embodiments, traffic handling policy 176 enforces a security policy for handling authentication requests based at least in part on an authentication request classification, such as to block, quarantine, or delete an authentication request predicted to be malicious/invalid or otherwise cause an authentication service not to process such an authentication request.

According to various embodiments, security platform 140 comprises DNS tunneling detector 138 and/or network traffic classifier 170. Security platform 140 may include various other services/modules, such as a malicious sample detector, a parked domain detector, an application classifier or other traffic classifier, etc. In response to receiving an indication that an assessment of a sample of network traffic (e.g., C2 type classification, determine whether the malicious/benign, etc.) is to be performed, security platform 140 analyzes the sample to determine the assessment of the network traffic (e.g., C2 traffic classification, determine whether the sample is malicious or benign/non-malicious, etc.) and/or an attribution of the network traffic (e.g., detection that the network traffic corresponds to a particular DNS tunneling campaign or tool).

In some embodiments, system 100 (e.g., a network traffic classifier 170 for security platform 140, an inline firewall or other inline security entity, etc.) determines whether information pertaining to a particular sample (e.g., a newly received sample or network traffic to be analyzed) is comprised in a dataset of historical samples (e.g., historical network traffic), whether a particular signature is associated with malicious traffic, whether the signature can be attributed to a particular DNS tunneling campaign or tool, or whether traffic (e.g., the authentication request(s)) corresponding to the sample to be otherwise handled in a manner different than the normal traffic handling. The historical information may be provided by a third-party service such as VirusTotal™. In response to determining that information pertaining to a sample is not comprised in, or available in, the dataset of historical samples, system 100 (e.g., security platform 140 or other inline security entity) may deem that the sample/traffic has not yet been analyzed and system 100 can invoke an analysis (e.g., a sample analysis) of the sample or a set of session data in connection with determining (e.g., predicting) the traffic classification (e.g., an inline security entity can query a classifier that uses the header information for the sample to query a machine learning model). The historical information (e.g., from a third-party service, a community-based score, etc.) indicates whether other vendors or cyber security organizations deem the particular traffic as malicious or should be handled in a certain manner.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C2 server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C2 server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious samples, detecting parked domains, or otherwise determining that certain detected network traffic is to be further analyzed (e.g., using a finer detection model).

In various embodiments, when a client device (e.g., client device 104) attempts to resolve an SQL statement or SQL command, or other command injection string, data appliance 102 uses the corresponding sample (e.g., an input string) as a query to security platform 140. This query can be performed concurrently with the resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. In other implementations, an inline security entity queries a mapping of hashes/signatures to traffic classifications (e.g., indications that the traffic is C2 traffic, indications that the traffic is malicious traffic, indications that the traffic is benign/non-malicious, etc.). This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may use a machine learning model to detect/predict whether the file is malicious) whether the queried file is a malicious file (or likely to be a malicious file) and provide a result back to data appliance 102 (e.g., "malicious file" or "benign file").

Figure 2:
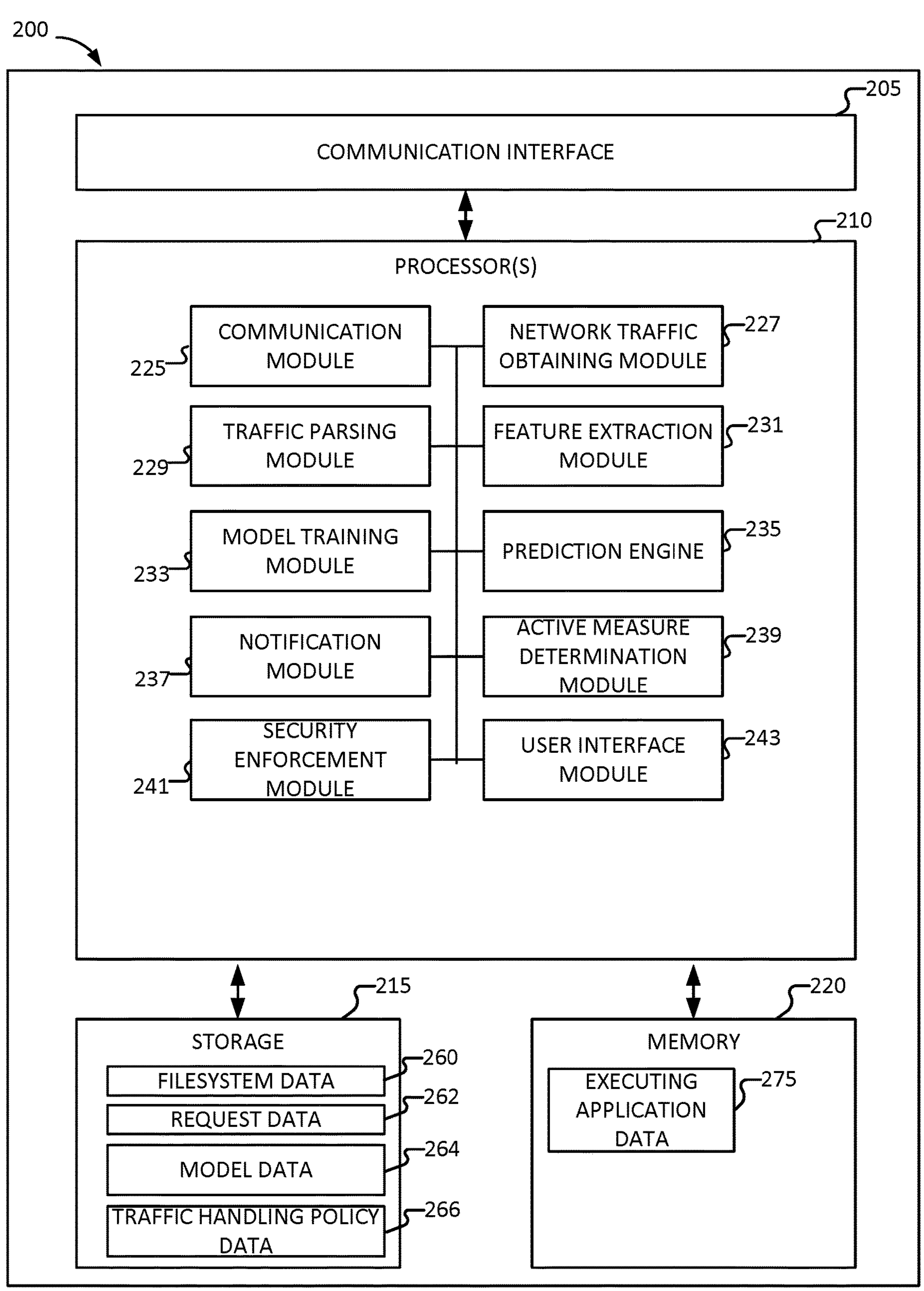
FIG. 2 is a block diagram of a system to classify authentication requests according to various embodiments.

FIG. 2 is a block diagram of a system to classify authentication requests according to various embodiments. In some embodiments, system 200 is implemented by at least part of system 100 of FIG. 1 and/or system 500 of FIG. 5. System 200 may implement one or more of processes 700-1200 of FIGS. 7-12, respectively. System 200 may be implemented in one or more servers, a security entity such as a firewall, an endpoint, a security service provided as a software as a service.

System 200 can be implemented by one or more devices such as servers. System 200 can be implemented at various locations on a network. In some embodiments, system 200 implements network traffic classifier 170 of system 100 of FIG. 1. As an example, system 200 is deployed as a service, such as a web service (e.g., system 200 performs contemporaneous/real-time detection of malicious authentication requests, detection of legitimate/benign/valid authentication request, determine/predict an authentication request classification, trains classifiers such as rule-based classifiers or machine learning-based classifiers, and/or handles traffic according to classifications, etc.). The service may be provided by one or more servers. For example, system 200 or network traffic classifier 170 is deployed on a remote server that monitors or receives network traffic that is transmitted within or into/out of a network and enforces security policies, classifies network traffic (e.g., classifies authentication requests as benign or malicious requests, etc.), sends/pushes out notifications or updates pertaining to the network traffic such as an indication that authentication requests from a particular source IP address are deemed malicious (e.g., invalid), an indication that from a certain source IP address is deemed non-malicious (e.g., benign or legitimate), or enables a user or other system to configure the security policy configuration for a network or a particular security entity (e.g., a firewall). In some embodiments, part of system 200 is implemented as a service (e.g., a cloud service provided by one or more remote servers) and another part of system 200 is implemented at a security entity or other network node such as a client device.

In some embodiments, system 200 is a proxy or other entity that mediates traffic to an authentication service. For example, system 200 classifies authentication requests such as in connection with filtering malicious or invalid authentication requests. System 200 obtains an authentication request classification and determines whether to provide the authentication request to an authentication service based at least in part on the authentication request classification. System 200 can forward authentication requests deemed to be a benign or legitimate. Conversely, system 200 can cause the authentication service to not process the authentication request (e.g., system 200 can delete, quarantine, or otherwise block transmission of the authentication request to the authentication service).

In some embodiments, system 200 receives network traffic samples (e.g., authentication requests), such as from inline security entities (e.g., firewalls) or a proxy via which client systems access an authentication service.

System 200 performs an authentication request classification with respect to authentication requests, such as authentication requests for processing by an authentication service for which system 200 mediates traffic. In some embodiments, system 200 obtains an authentication request classification based at least in part on a set of attributes associated with an authentication request. System 200 can obtain the authentication request classification by querying a classifier for a predicted classification. The classifier may be a machine learning model, such as an XGBoost model.

System 200 stores signatures of classified authentication requests or classifications for a set of attributes associated with the authentication requests in association with the determined classifications. The index/mapping of signatures to classifications may be used for a quick look up to determine a classification of a sample (e.g., an authentication request for which system 200 is to determine whether an authentication service is to be performed). The index/mapping of signatures to classifications (e.g., whitelists, blacklists, etc.) can be sent to inline security entities or proxies for authentication services, which can perform the lookup against the index/mapping inline or in real-time, such as before determining to send the sample(s) to system 200 for analysis or determining whether to cause an authentication service to process the authentication request.

In response to determining a classification of the authentication request, system 200 can cause the authentication request to be handled according to the classification. For example, system 200 implements, or causes inline security entities to implement, a security policy to determine the handling of authentication requests according to classifications. In response to determining that the authentication request is classified as malicious, the corresponding authentication request is handled as malicious (e.g., quarantined, blocked, deleted, etc.). In response to determining that the authentication request is classified as non-malicious/benign, the corresponding authentication request is handled as non-malicious (e.g., permitted to be transmitted to the authentication service).

In the example shown, system 200 implements one or more modules in connection with enforcing a security policy configuration (e.g., a policy of), classifying network samples, such as multi-modal exploits, etc. System 200 comprises communication interface 205, one or more processor(s) 210, storage 215, and/or memory 220. One or more processors 210 comprises one or more of communication module 225, network traffic obtaining module 227, traffic parsing module 229, feature extraction module 231, model training module 233, prediction engine 235, notification module 237, active measure determination module 239, security enforcement module 241, and user interface module 243.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides to communication module 225 information received by system 200. Communication module 225 is configured to receive an indication of samples (e.g., network traffic samples, such as authentication requests, HTTP requests, URLs, URIs, SSL communications, etc.) to be analyzed, such as from network endpoints or nodes such as security entities (e.g., firewalls), database systems, query systems, proxies for web services, etc. Communication module 225 is configured to query third party service(s) for information pertaining to the network traffic classifications (e.g., services that expose information/classifications for signatures/hashes of network traffic such as third-party scores or assessments of maliciousness of particular traffic, a community-based score, assessment, or reputation pertaining to domains or applications, a blacklist for authentication requests or an attribute associated with certain authentication requests, or certain types/signatures of network traffic such as HTTP requests, and/or a whitelist for authentication requests or an attribute associated with certain authentication requests or other certain types of network traffic, etc.). For example, system 200 uses communication module 225 to query the third-party service(s). Communication module 225 is further configured to receive one or more settings or configurations from an administrator. Examples of the one or more settings or configurations include configurations of a process determining whether a particular type of traffic (e.g., a particular HTTP request) is permitted, malicious, benign, etc., a format or process according to which a feature vector or embedding is to be determined, a set of feature vectors or embeddings to be provided to a classifier for determining the traffic classification (e.g., for predicting an authentication request classification, such as a prediction of whether an authentication request is malicious/non-malicious or legitimate/invalid, etc.), information pertaining to a whitelist of authentication requests or an attribute(s) associated with certain authentication requests, configuration of classifiers such as rule-based classifiers or machine learning-based classifiers, etc.

In some embodiments, system 200 comprises network traffic obtaining module 227. System 200 uses network traffic obtaining module 227 to receive network traffic samples. In some embodiments, such as in contexts where system 200 is an inline security entity that performs detection of malicious samples in-line with the transmission of data across the network, network traffic obtaining module 227 obtains the network traffic samples as the data is transmitted across the network. In various embodiments, such as in contexts where system 200 is a cloud service that detects malicious samples upon request from an inline security entity, network traffic obtaining module 227 obtains a request to classify a network traffic sample(s) (e.g., to obtain an authentication request classification). The request may comprise the network traffic sample(s) or information extracted from the network traffic sample(s) (e.g., information extracted by the system or service requesting classification from system 200). The request may be communicated to system 200 by an inline security entity, a client device, etc.

In some embodiments, in contexts in which system 200 is an inline security entity for an authentication service (e.g., a proxy that mediates traffic to an authentication service), network traffic obtaining module 227 obtains authentication requests that are intended for the authentication service. In response to network traffic obtaining module 227, system 200 may determine an authentication request classification, and handle the authentication request based at least in part on the authentication request classification such as to permit legitimate requests to be processed by the authentication service and to block or delete illegitimate or malicious requests from being communicated the authentication service (e.g., to inhibit the overwhelming of the authentication service intended by a denial of service attack).

In some embodiments, system 200 comprises traffic parsing module 229. System 200 uses traffic parsing module 229 to parse authentication requests obtained by network traffic obtaining module 227. Traffic parsing module 229 can parse an authentication request to extract information that characterizes the authentication request sample, such as information (e.g., a set of attributes associated with the authentication request) that can be used to predict a classification of the authentication request (e.g., to predict whether the authentication request sample is malicious or a likelihood that the authentication request sample is malicious). For example, the information obtained by traffic parsing module 229 can be used to generate features or embeddings to be used to query a classifier for a predicted classification, or used to check against a predefined set of rules for a rule-based classifier.

In some embodiments, traffic parsing module obtains a set of attributes associated with the authentication request. Examples of attributes that can be extracted based on the authentication request include any combination including one or more of source IP address, firewall identifier, destination address (e.g., destination URL), source location (e.g., source geolocation), etc.

In some embodiments, system 200 comprises feature extraction module 231. System 200 uses feature extraction module 231 to determine features based at least in part on the information parsed from the authentication request samples (e.g., by traffic parsing module 229). The features may be predefined based on the particular classifier that uses the features to generate the predicted classification (e.g., the authentication request classification. Feature extraction module 231 may generate features (e.g., to be used to query a classifier) based at least in part on a set of attributes, such as attributes from which a machine learning model can predict an authentication request classification (e.g., malicious or non-malicious, etc.).

In some embodiments, system 200 comprises model training module 233. System 200 uses model training module 233 to train a classifier to predict authentication request classifiers. The classifiers can be rule-based classifiers or machine learning-based classifiers (e.g., machine learning models).

In the case of rule-based classifiers, the classifier predicts a classification for an authentication request sample based on the one or more rules (e.g., from a predefined set of rules associated with the classifier) that an authentication request sample satisfies (or does not satisfy). In some implementations, one or more rules of the set of rules are manually defined, such as by a subject matter expert. In some implementations, one or more rules of the set of rules are defined based on an artificial intelligence process.

In the case of machine learning-based classifiers, the classifier predicts a classification based on querying a machine learning model. The machine learning model can be trained via a machine learning process using a training set (e.g., a set of historical malicious authentication request samples and a set of historical benign authentication request samples). Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the model is an XGBoost model.

In some embodiments, system 200 comprises prediction engine 235. System 200 uses prediction engine 235 to classify the authentication request. Prediction engine 235 may implement a rule-based classifier or a machine learning-based classifier (e.g., a ML model). In some embodiments, the classifier is an XGBoost model. Various other types of classifiers may be implemented.

In some embodiments, system 200 comprises notification module 237. System 200 uses notification module 237 to provide an indication of the authentication request classification, such as an indication whether the authentication request is malicious or invalid, an indication that the authentication request is benign or legitimate, an indication of a likelihood of whether the authentication request is malicious, etc. Notification module 237 provides the indication (e.g., the report) to another system or service, such as inline security or other security entity requesting the traffic classification or otherwise handling the traffic, or an administrator system (e.g., used by a network administrator while evaluating a security policy posture, etc.), etc. Notification module 237 may also provide an indication of an active measure to be implemented (e.g., the active measure determined by active measure determination module 239) or a recommendation for an active measure to be implemented (e.g., a recommendation for handling the traffic based on the classification, etc.). Notification module 237 may provide to a source or proxy from which an authentication request deemed to be malicious an indication that an authentication service will not process the authentication request.

System 200 may use notification module 237 to provide to one or more security entities (e.g., a firewall), nodes, proxies for authentication services, etc. an update to a whitelist of authentication requests, such as a whitelist of IP addresses (e.g., IP addresses from which HTTP requests originate) or a whitelist of traffic signatures (e.g., hashes for authentication request samples deemed to be benign). According to various embodiments, notification module 237 obtains a hash, signature, or other unique identifier associated with authentication request or a set of attributes for the authentication request, and provides the indication of whether the sample is malicious in connection with the hash, signature, or other unique identifier associated with the sample. Additionally, or alternatively, notification module 237 provides to one or more security entities, nodes, proxies for authentication services, etc. an update to a blacklist of authentication requests, such as a blacklist of IP addresses or a blacklist of authentication request signatures for traffic deemed to be (e.g., previously classified as) malicious.

According to various embodiments, the hash of a sample corresponds to a hash of an IP address (e.g., the IP address from which the HTTP request originates), a hash of header information, a hash of header information that is formatted according to a predefined format, etc. A security entity or an endpoint may compute a hash of a sample or traffic monitored/analyzed. The security entity or an endpoint may determine whether the computed hash corresponding to the sample is comprised within a set such as a whitelist of benign traffic (e.g., authentication requests), and/or a blacklist of traffic (e.g., authentication requests), etc. If a signature for a received sample is included in the set of signatures for samples previously deemed malicious (e.g., a blacklist of samples), the security entity or an endpoint can prevent the transmission of the corresponding traffic or prevent traffic to/from a client device from which malicious traffic was collected, or otherwise prevent the traffic originating from such client device or node deemed to be associated with malicious traffic from being transmitted to, and/or processed by, the authentication service.

In some embodiments, system 200 comprises active measure determination module 239. System 200 uses active measure determination module 239 to determine an active measure to recommend or implement the active measure based on the evaluation result (e.g., the classification, such as the authentication request classification obtained by prediction engine 235). System 200 may store, or have access to, a mapping of contexts to active measures. The contexts may correspond to classifications, such as a classification that the authentication request is malicious/invalid, a classification that the authentication request is benign or non-malicious (e.g., legitimate), etc. In response to system 200 determining a classification, active measure determination module 239 may query the mapping of contexts to active measures to determine the active measure to be implemented. Examples of active measures may include generating an alert/notification of an evaluation result (e.g., informing a system administrator that a malicious authentication requests are detected), quarantining or blocking transmission of authentication requests classified as malicious, etc. Various other active measures may be implemented/recommended.

In some embodiments, active measure determination module 239 implements the active measure. As an example, active measure determination module 239 causes the active measure to be implemented, such as by system 200 (e.g., another module in system 200) or another system/service.

In some embodiments, system 200 comprises security enforcement module 241. System 200 uses security enforcement module 241 to enforce one or more security policies with respect to information such as network traffic, files, etc. Security enforcement module 241 enforces the one or more security policies based on whether the authentication request is determined to be malicious. For example, system 200 uses security enforcement module 241 to perform an active measure, or cause an inline security entity (or a proxy to an authentication service) to perform the active measure (e.g., in the case that system 200 is a cloud service), with respect to the network traffic in response to detecting the that the traffic corresponds to a malicious authentication request. As an example, in the case of system 200 being a security entity (e.g., a firewall) or firewall, system 200 comprises security enforcement module 241. Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, and/or other file transfers.

In some embodiments, system 200 comprises user interface module 243. System 200 uses user interface module 243 to configure and provide a user interface to a user, such as to a client system used by an administrator. User interface module 243 configures a user interface to provide the notifications or alerts, such as prompting the user that malicious authentication request is detected or has been handled, prompting the user to select an active measure to be performed with respect to particular traffic, etc.

In some embodiments, system 200 uses user interface module 243 to configure a user interface via which a user/administrator can configure the system, such as to define or update security policies, configure the classifier for predicting authentication request classifications, define machine learning processes to be used to train the classifiers, rules for a rule-based classifier, etc.

According to various embodiments, storage 215 comprises one or more of filesystem data 260, request data 262, model data 264, and traffic handling policy data 266. Storage 215 comprises a shared storage (e.g., a network storage system) and/or database data, and/or user activity data.

In some embodiments, filesystem data 260 comprises a database such as one or more datasets (e.g., datasets comprising samples of authentication requests, mappings of indications for authentication requests or predicted authentication request classifications for network traffic to the authentication requests or hashes, signatures or other unique identifiers of the authentication requests, etc.). Filesystem data 260 comprises data such as historical information pertaining to HTTP request data or network traffic, a whitelist of network traffic profiles (e.g., hashes or signatures for the HTTP request data) or IP addresses deemed to be safe (e.g., not suspicious, benign, etc.), a blacklist of network traffic (e.g., authentication request) profiles deemed to be suspicious or malicious, etc.

In some embodiments, request data 262 comprises authentication request samples, such as samples collected from monitoring a network or from inline security entities that communicate the samples to system 200 for analysis. The samples may be collected from a proxy that mediates traffic to an authentication service, such as to perform a filtering of authentication requests to rate limit authentication requests predicted to be malicious/invalid. Request data 262 may also include historical data, such as historical malicious samples and historical benign samples. The historical data can be used as a training set for training the classifier for predicting authentication request classifications. For example, the training set can be used to train such a classifier(s) using a machine learning process.

In some embodiments, model data 264 comprises data generated in connection with classifying the authentication request samples with the classifier (e.g., prediction engine 235). For example, model data 264 comprises features or embeddings generated to query the classifiers. Additionally, model data 264 comprises a verdict or classification (e.g., an indication that the authentication request sample is malicious or benign, an indication of a probability or likelihood that the authentication request sample is malicious, etc.). Model data 264 may also include other information pertaining to the authentication request samples, such as header information, an indication of a traffic protocol for a particular network traffic sample, a source IP address, etc. Model data 264 may comprise various other types of attributes for the authentication requests. In some embodiments, model data 264 stores the one or more classifiers, such as a rule-based classifier (e.g., a classifier that generates a predicted authentication request classification based on a set of rules) or a machine learning model that predicts an authentication request classification.

In some embodiments, traffic handling policy data 266 comprises one or more policies to be enforced by a security entity. For example, traffic handling policy data 266 comprises a policy that defines how authentication requests are to be handled based on corresponding authentication request classifications.

According to various embodiments, memory 220 comprises executing application data 275. Executing application data 275 comprises data obtained or used in connection with executing an application such as an application executing a hashing function, an application to extract information from webpage content, an input string, an application to extract information from a file, or other sample, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious authentication requests, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

Figure 3A:
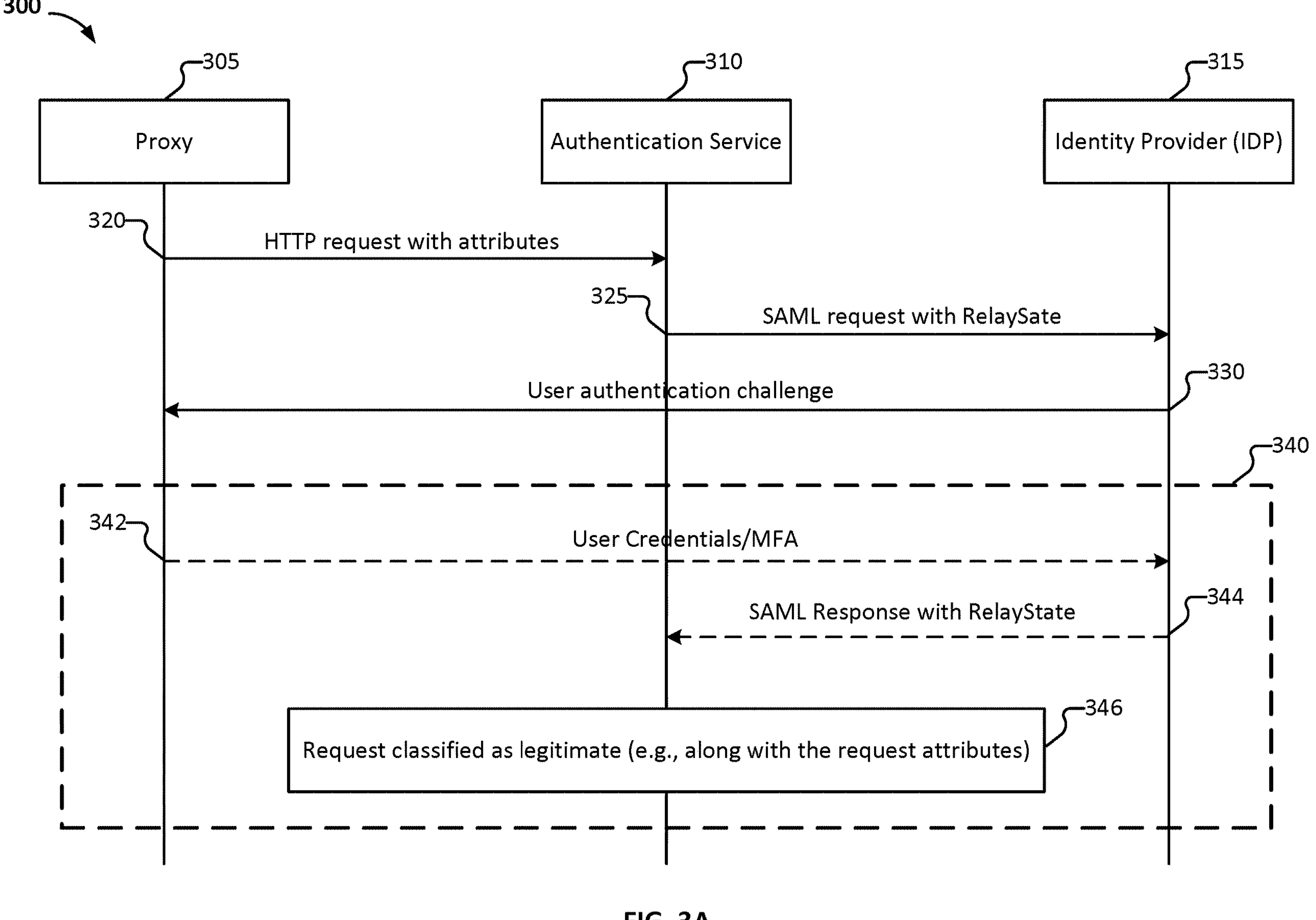
FIG. 3A is an illustration of a system for determining that an authentication request is benign according to various embodiments.
Figure 3B:
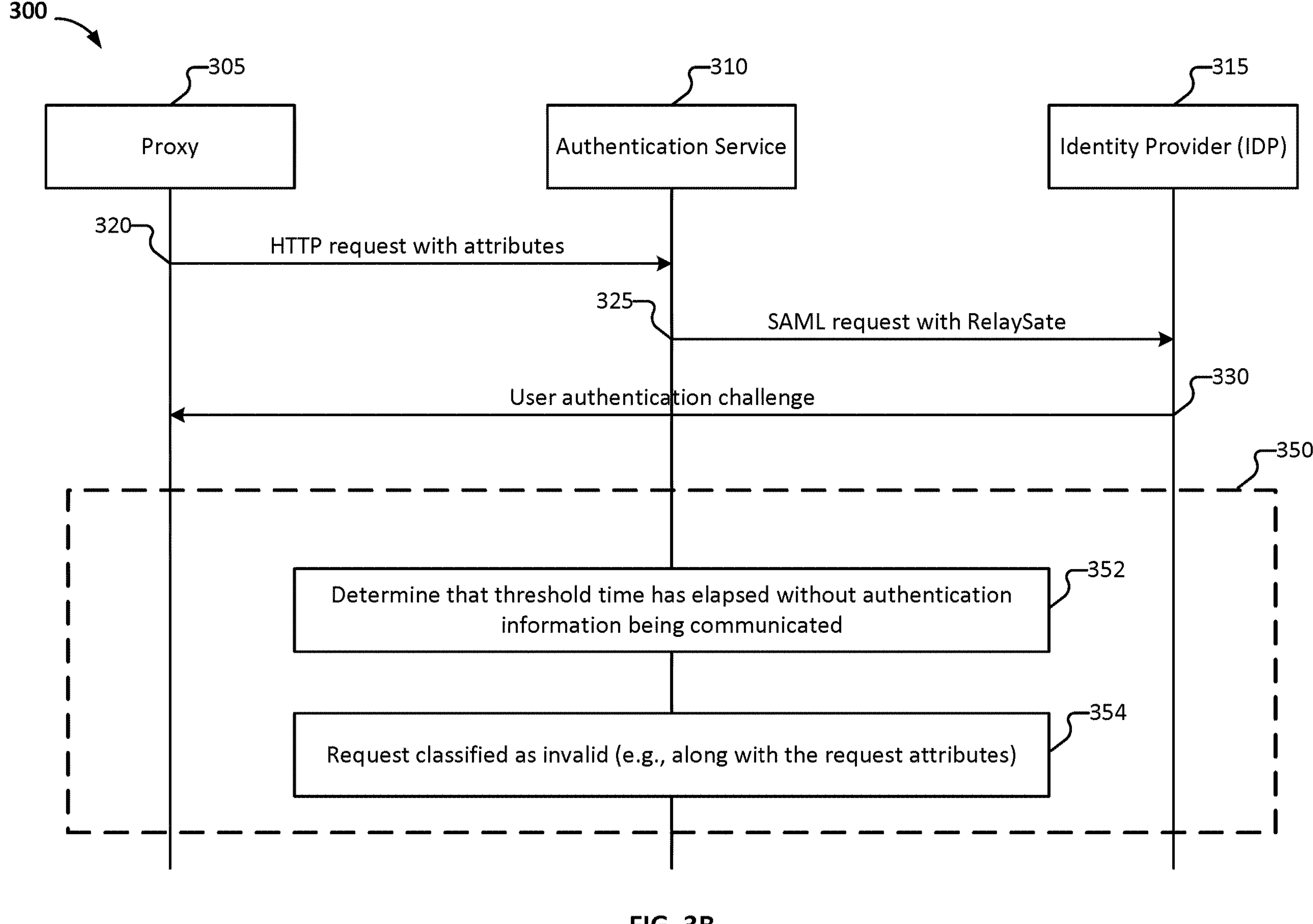
FIG. 3B is an illustration of a system for determining that an authentication request is malicious according to various embodiments.

FIG. 3A is an illustration of a system for determining that an authentication request is benign according to various embodiments. Conversely, FIG. 3B is an illustration of a system for determining that an authentication request is malicious according to various embodiments. In some embodiments, system 300 is implemented at least in part by system 100 of FIG. 1 and/or system 200 of FIG. 2. In the example shown, system 300 comprises authentication service 310. Authentication service 310 process authentication requests for users or client systems, such as client systems that use proxy 305 to communicate with authentication service 310. System 300 may further comprise identity provider (IDP) 315 that can provide an authentication service for third party service providers (e.g., apps, websites, or other digital services). Authentication service 310 may be a proxy that filters authentication requests (e.g., rate limits requests) sent to IDP 315. As an example, IDP 315 is a trusted provider that enables users or other systems to use a single sign-on (SSO) to access other websites or web services. An example of IDP 315 is Okta.

In some embodiments, authentication service 310 rate limits authentication requests IDP 315. For example, authentication service 310 determines a classification for authentication requests (e.g., as benign/valid or malicious/invalid, etc.) and based on the classification determines whether to send a received authentication request to IDP 315 for authentication. Accordingly, authentication service 310 protects IDP 315 from denial of service attacks.

The example shown provides a process for training a classifier to predict authentication request classifications. Additionally, or alternatively, the process illustrated may be implemented in connection with providing an authentication service for certain authentication requests.

At 320, authentication service 310 receives an authentication request via proxy 305. For example, a user, client system, or other service connects to proxy 305 in connection with requesting authentication for a service. In some embodiments, the authentication request comprises an identifier, such as an account identifier/number, a user ID, or other login username. The authentication request may be an HTTP request having a set of associated attributes.

At 325, authentication service 310 sends the authentication request to IDP 315. For example, authentication service 310 provides sends the authentication request as a security assertion markup language request SAML) request with a relay state.

In some embodiments, when system 300 is training a classifier, authentication service 310 may send the authentication request without first determining a corresponding authentication request classification. For example, authentication service 310 does not filter out authentication requests predicted to be malicious or invalid. Accordingly, system 300 can monitor the interaction between proxy 305 and the authentication service to determine whether the authentication request was valid or invalid, and correspondingly train the classifier (e.g., based at least in part on the set of attributes associated with the authentication request).

In some embodiments, when system 300 is operating to rate limit authentication requests forwarded to IDP 315 for authentication, authentication service 310 first determines a predicted classification for the authentication request received from proxy 305, and in response to determining that a predicted classification indicates that the request is benign or valid, authentication service 310 forwards the authentication request to IDP 315 for authentication processing.

At 330, in response to obtaining the authentication request, IDP 315 communicates an authentication challenge to proxy 305. For example, IDP 315 requests user/login credentials or other action taken in connection with a multi-factor authentication (e.g., an input to an application associated with authentication provider, the input being made to a user device or client system associated with the authentication request, etc.).

At 340, in response to the authentication service being provided for the authentication request (e.g., by IDP 315), the system monitors the processing of the authentication request in connection with classifying the authentication request for training/re-training a classifier. For example, the system monitors the exchange of credentials and response from IDP 315, such as a result for the authentication.

At 342, proxy 305 sends the user credentials or other multi-factor authentication input (e.g., an input to an application running locally on the client device from which the authentication request originated). In denial of service attacks, the client systems or proxy 305 does not provide a response to the authentication challenge. For example, the denial of service attacks are configured to merely overwhelm the authentication service with authentication requests (e.g., requests that are never fully processed for a legitimate authentication). In some embodiments, in response to proxy 305 providing a response to the authentication challenge, system 300 can deem the authentication request to be legitimate.

At 344, IDP 315 provides an SAML response to authentication service 310. For example, in response to receiving the user credentials or other multi-factor authentication input, identify provider 315 authenticates the user/client system associated with the authentication request and provides authentication service 310 with a verdict.

At 346, system 300 classifies the authentication request as legitimate. In some embodiments, system 300 (e.g., authentication service 310) deems the authentication request to be legitimate (e.g., non-malicious) and system 300 uses the classification and the set of attributes associated with the authentication request to train the classifier for predicting classifications of authentication requests.

In the example shown, at 350, system 300 monitors exchanges among proxy 305, authentication service 310 and/or identity provider 315 in connection with determining whether the authentication request is legitimate (e.g., valid/non-malicious). In response to the authentication service for the authentication request (e.g., by IDP 315), the system monitors the processing of the authentication request in connection with classifying the authentication request for training/re-training a classifier. In some embodiments, in response to IDP 315 providing an authentication challenge for an authentication request being processed, system 300 monitors the exchanges among proxy 305, authentication service 310 and/or identity provider 315 to determine whether the authentication request was a legitimate request.

In some embodiments, system 300 (e.g., authentication service 310) starts a timer upon IDP 315 providing an authentication challenge for an authentication request. At 352, system 300 (e.g., authentication service 310) determines that a threshold time has elapsed without authentication information being communicated (e.g., authentication information, such as user credentials or multi-factor authentication inputs, sent in response to the authentication challenge).

In some embodiments, in response to determining that authentication information (e.g., authentication credentials) has not been received within a threshold time, system 300 can deem the authentication request to be invalid/malicious. At 354, system 350 classifies the request as invalid. System 300 uses the classification and the set of attributes associated with the authentication request to train the classifier for predicting classifications of authentication requests.

Figure 4:
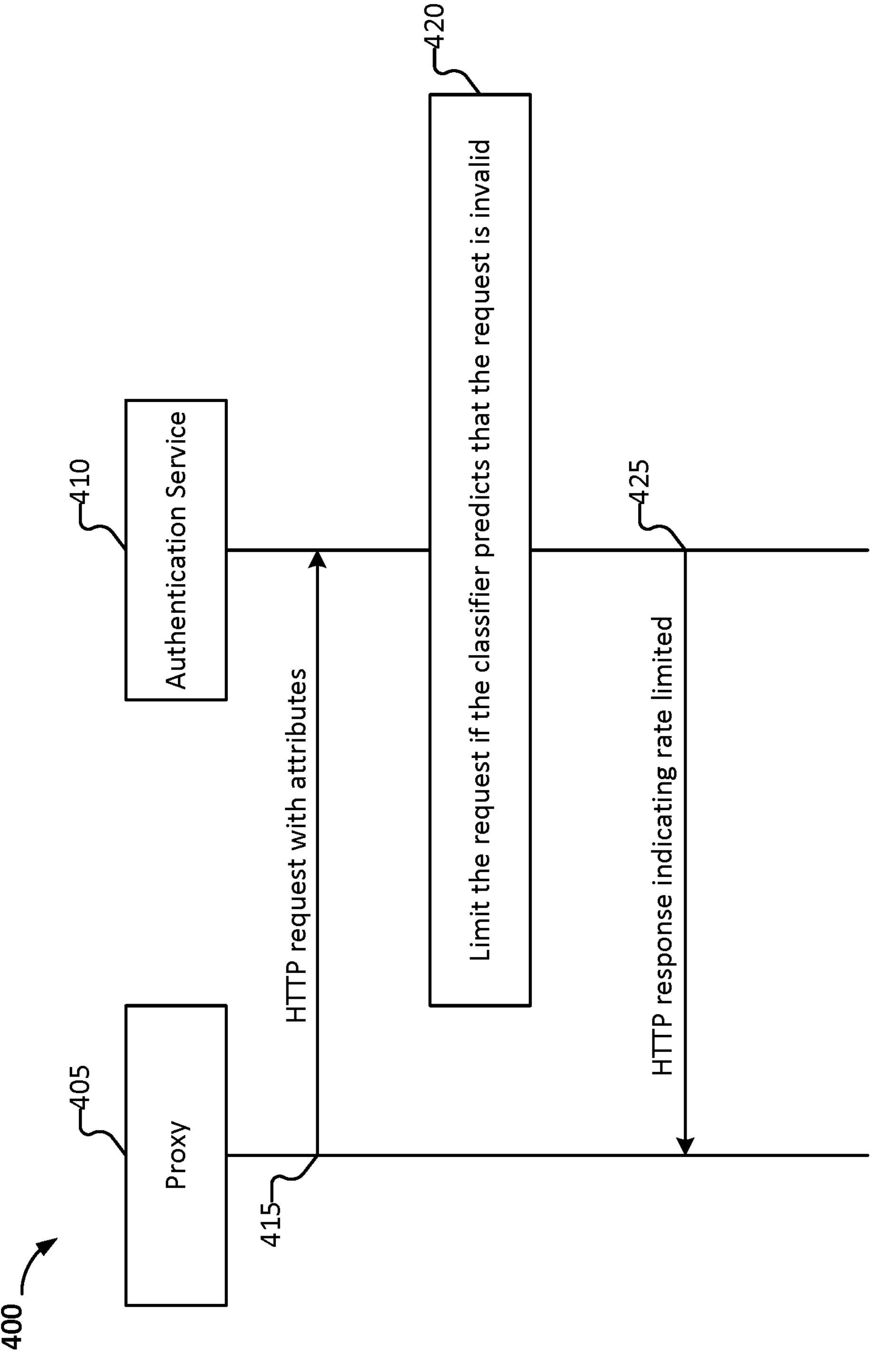
FIG. 4 is an illustration of a system for handling an authentication request according to various embodiments.

FIG. 4 is an illustration of a system for handling an authentication request according to various embodiments. In some embodiments, system 400 is implemented at least in part by system 100 of FIG. 1 and/or system 200 of FIG. 2. In the example shown, system 400 comprises authentication service 410. Authentication service 410 process authentication requests for users or client systems, such as client systems that use proxy 405 to communicate with authentication service 410.

As illustrated, at 415, authentication service 410 receives an authentication request from proxy 405. In some embodiments, authentication service 410 comprises a proxy that filters out untrusted authentication requests, such as to rate limit authentication requests. The authentication request may be an HTTP request having a set of associated attributes.

At 420, authentication service 410 (or a proxy for authentication service 410) rate limits the authentication request. In response to receiving the authentication request from proxy 405, authentication service 410 classifies the authentication request. If the authentication request is classified as invalid/malicious, the system limits service for the request.

In some embodiments, the system classifies the authentication request by querying a classifier for a predicted classification. The classifier may be a machine learning model, such as an XGBoost that provides a prediction of whether the authentication request is trusted or a likelihood that the authentication request is trusted.

In some embodiments, the system classifies the authentication request based on querying a set of previously classified authentication requests (e.g., a whitelist, a blacklist, etc.) to determine whether the authentication request (or an authentication request matching the received authentication request) has been previously classified. In response to determining that the authentication request (or a matching authentication request) has been previously classified, the system can deem the received authentication request as having the same classification. In some embodiments, a classification for an authentication request expires after a predefined time threshold. For example, upon the predefined time threshold lapsing after classification of a particular authentication request, the set of previously classified authentication requests may be updated to remove or otherwise render invalid the previous classification for the particular authentication request.

At 425, the system provide an indication that authentication service is rate limited for proxy 405 or the user/client system associated with the authentication request. In some embodiments, in response to determining that the authentication request is invalid/malicious, the system (e.g., authentication service 410 or a proxy for authentication service 410) refuses to process the authentication request and provide the authentication service. For example, the system provides an indication that the authentication request is rate limited (e.g., that the authentication service will not be provided for the authentication request or system from which the authentication request originated.

Figure 5:
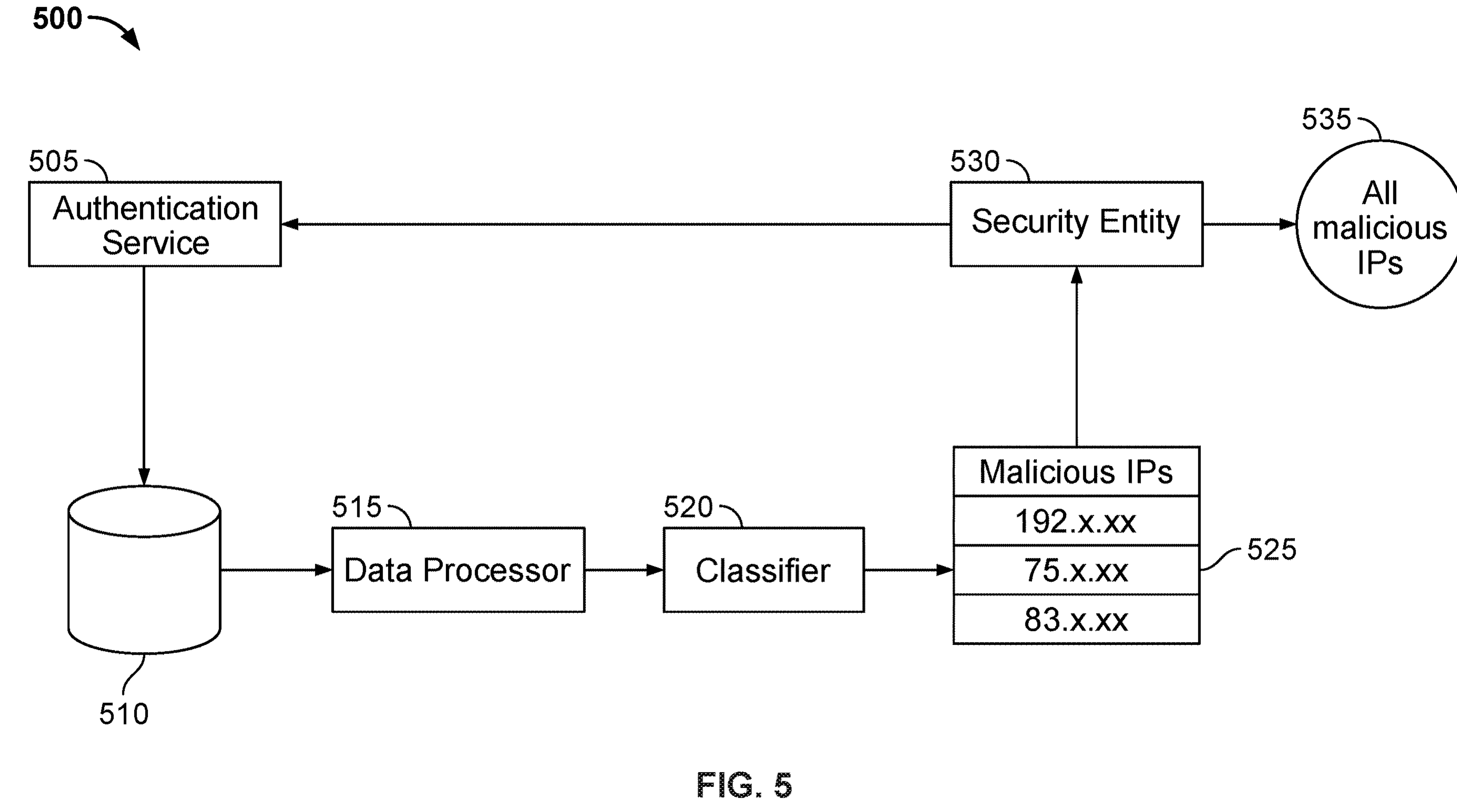
FIG. 5 is a block diagram of a system for identifying malicious authentication requests according to various embodiments.

FIG. 5 is a block diagram of a system for identifying malicious authentication requests according to various embodiments. In some embodiments, system 500 is implemented at least in part by system 100 of FIG. 1 and/or system 200 of FIG. 2. In the example shown, system 500 comprises authentication service 505, database 510, data processor 515, classifier 520, a set of malicious IP addresses 525 (e.g., a blacklist of IP addresses) and security entity 530.

In some embodiments, system 500 downloads from authentication service 505 a set of authentication requests and corresponding attributes to database 510. For example, database 510 stores downloaded logs on a secure disk.

System 500 uses data processor 515 to pre-process the data comprised in the downloaded logs. For example, data processor 515 parses the authentication requests to obtain a corresponding set of attributes. The logs may also include information pertaining to the authentication process, such as an indication of whether user credentials were received for the authentication request in response to an authentication challenge being communicated.

In response to obtaining the set of attributes, system 500 queries classifier 520 for predicted classifications associated with the set of authentication requests. Classifier 520 may be queried with respect to a particular authentication request based at least in part on the set of attributes for the particular authentication request. Classifier 520 can use one or more of the set of attributes for the particular authentication request to determine a predicted classification. In some embodiments, classifier 520 is an artificial-intelligence model or machine learning model, such as an XGBoost model.

System 500 stores the predicted classifications obtained from classifier 520. For example, with respect to authentication requests predicted to be malicious or invalid/non-legitimate, system 500 stores an indication that the authentication request is malicious/invalid. System 500 may store one or more attributes associated with authentication requests deemed to be malicious/invalid. For example, system 500 stores in a list (e.g., a blacklist) source IP addresses for authentication requests deemed to be malicious/invalid. As another example, system 500 stores in a list (e.g., a whitelist) source IP addresses for authentication requests deemed to be non-malicious/valid. Various other types of mappings of attributes to indications of whether authentication requests are malicious/non-malicious may be implemented. For example, system 500 may store a mapping of hashes/signatures for authentication requests to indications of whether the authentication requests are malicious/non-malicious.

In the example shown, system 500 stores for authentication requests deemed to be malicious/invalid a source IP address in a set of malicious IP addresses 525.

System 500 causes security entity 530 to handle authentication requests based on the predicted classifications. For example, system 500 provides the set of malicious IP addresses 525 or access to the set of malicious IP addresses 525 to security entity 530. For authentication requests having a source IP address included int eh set of malicious IP addresses 525 system 500 handles the authentication requests according to a security policy. For example, security entity 530 may quarantine the authentication request in quarantine 535. Alternatively, security entity 530 may delete or otherwise prevent transmission of authentication requests originating at a source IP address that is in the set of malicious IP addresses 525.

Security entity 530 may permit transmission of authentication requests deemed to be benign/valid to authentication service 505. For example, in response to determining that a source IP address for an authentication request is not comprised in the set of malicious IP addresses 525, security entity 530 causes the authentication request to be provided to authentication service 505 for processing.

Figures 6A, 6B:
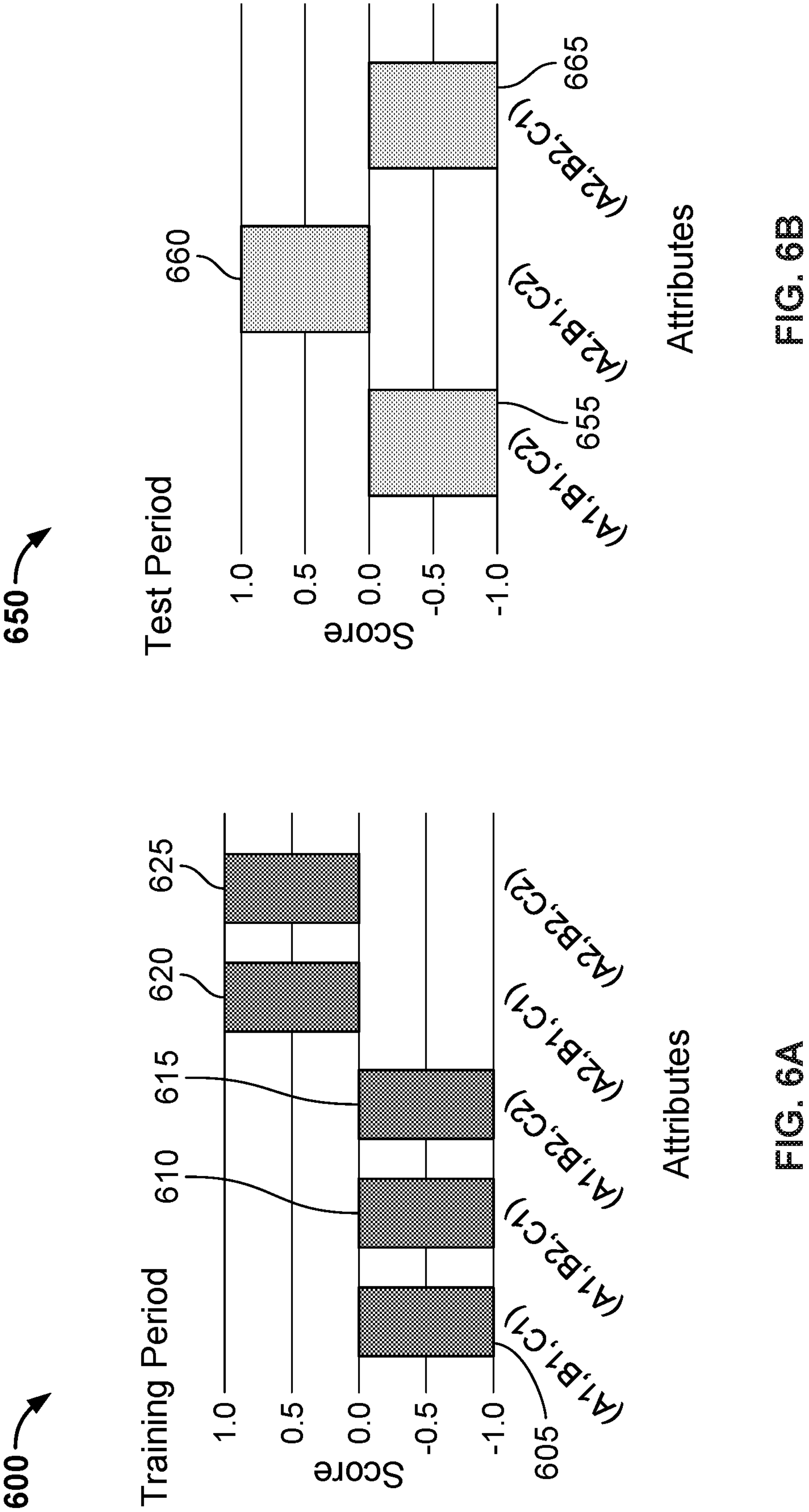
FIG. 6A is a diagram of set of authentication requests used to train a classifier for detecting trusted authentication requests according to various embodiments.
FIG. 6B is a diagram of set of authentication requests used to classify authentication requests according to various embodiments.

FIG. 6A is a diagram of set of authentication requests used to train a classifier for detecting trusted authentication requests according to various embodiments. In the example shown, training set 600 of authentication requests (e.g., authentication requests 605, 610, 615, 620, and 625) are used to train a classifier for predicting whether a sample authentication request is trusted or untrusted. Training set 600 comprises a subset of malicious/untrusted authentication requests, such as authentication requests 605, 610, and 615, which respectively have attributes (A1, B1, C1), (A1, B2, C1), and (A1, B2, C2). Training set 600 further comprises a subset of trusted/benign authentication requests, such as authentication requests 655, 660, and 665, which respective have attributes (A1, B1, C2), (A2, B1, C2), and (A2, B2, C1).

FIG. 6B is a diagram of set of authentication requests used to classify authentication requests according to various embodiments. In response to training a classifier (e.g., a machine learning model), the system can perform a test period or deployment period. For example, the system uses the classifier to make a set of predictions 650 for sample authentication requests. In the example shown, the classifier predicts that authentication request 655, having attributes (A1, B1, C2), is untrusted or malicious. Similarly, the classifier predicts that authentication request 665, having attributes (A2, B2, C1), is untrusted or malicious. Further, the classifier predicts that authentication request 660, having attributes (A2, B1, C2), as being trusted.

Figure 7:
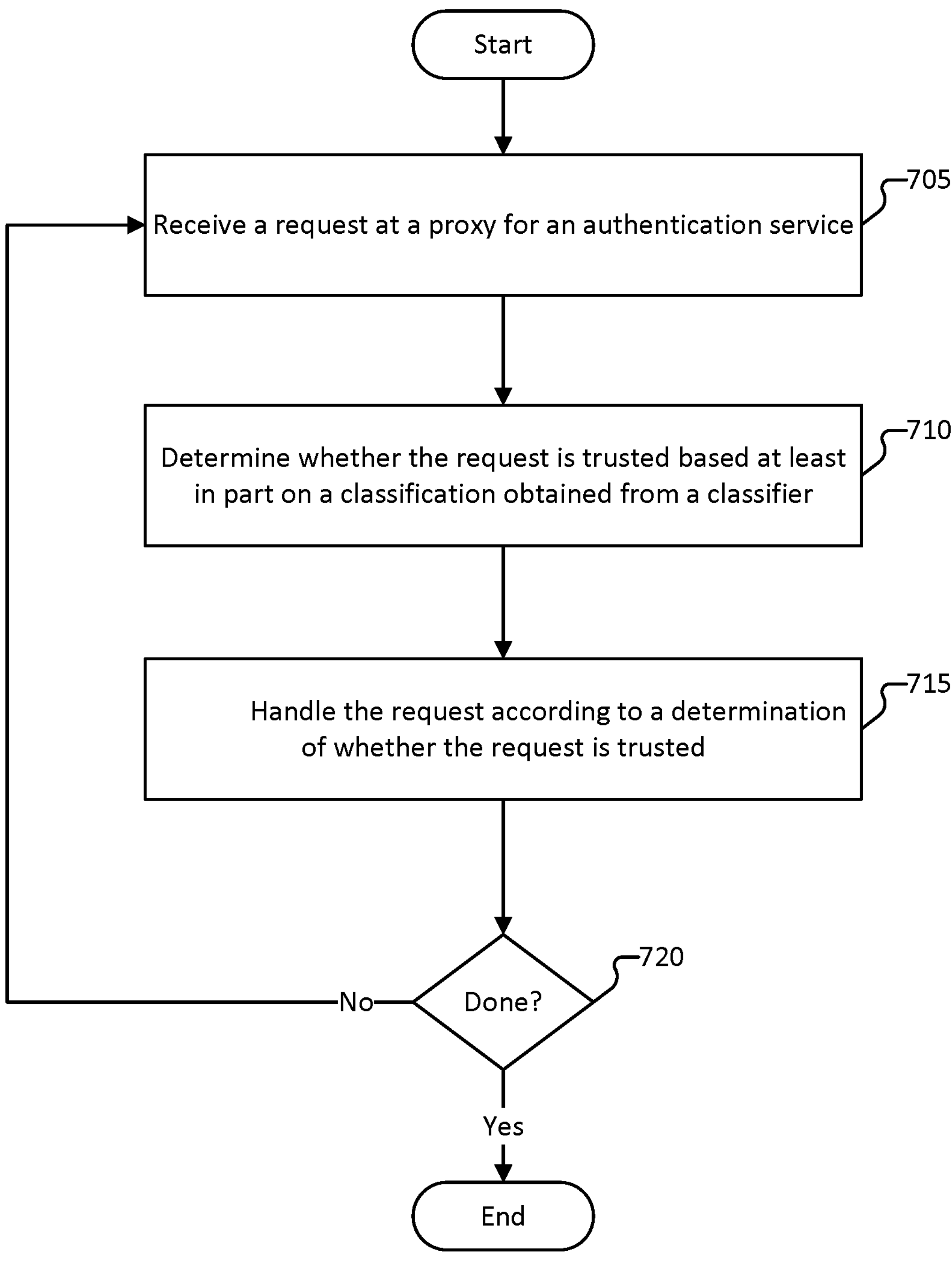
FIG. 7 is a flow diagram of a method for handling requests based on a determination of whether the request is trusted according to various embodiments.

FIG. 7 is a flow diagram of a method for handling requests based on a determination of whether the request is trusted according to various embodiments. In various embodiments, process 700 is implemented at least in part by system 100 of FIG. 1, system 200 of FIG. 2, and/or system 500 of FIG. 5.

In some implementations, process 700 may be implemented by one or more servers, such as in connection with providing a service to a network (e.g., a security entity and/or a network endpoint such as a client device). In some implementations, process 700 may be implemented by a security entity (e.g., a firewall) such as in connection with enforcing a security policy with respect to traffic sent across a network. For example, process 700 is implemented by a security entity that mediates traffic to an authentication service.

At 705, the system receives a request at a proxy for an authentication service. For example, the system receives an authentication request from a trusted network entity (e.g., a proxy service).

At 710, the system determines whether the request is trusted based at least in part on a classification obtained from a classifier. In some embodiments, in response to receiving the authentication request, the system determines a classification for the authentication request. For example, the system queries the classifier (e.g., an ML model configured to predict a classification for authentication requests) for a classification. As another example, the system determines whether an authentication request having a same set of attributes (or a similar set of attributes) was previously classified. If the system determines that a similar authentication request was previously classified within a preceding threshold period of time (e.g., by querying a blacklist or whitelist, etc.), the system may use such previous classification as the classification for the received authentication request. Conversely, if the system determines that a similar authentication request was not previously classified, the system may query the classifier for a predicted classification.

In some embodiments, the classification is indicative of a likelihood that the authentication request is trusted (e.g., a valid authentication request) or a likelihood that the authentication request is untrusted (e.g., invalid or part of a denial of service attack).

At 715, the system handles the request according to a determination of whether the request is trusted. In some embodiments, the system handles the authentication request according to a predefined security policy.

In some embodiments, if the authentication request is determined to be trusted, the system can cause an authentication service to process the authentication request. For example, the system can transmit the authentication request to the authentication service for processing.

In some embodiments, if the authentication request is determined to be untrusted, the system can cause an authentication service not to process the authentication request. For example, the system blocks transmission of the untrusted authentication request to the authentication service. As another example, the system quarantines or deletes the untrusted authentication request.

At 720, a determination is made as to whether process 700 is complete. In some embodiments, process 700 is determined to be complete in response to a determination that no further authentication requests are to be handled, no further authentication requests are to be analyzed (e.g., no further predictions for traffic, such as authentication requests, are needed), no further network traffic is received, an administrator indicates that process 700 is to be paused or stopped, etc. In response to a determination that process 700 is complete, process 700 ends. In response to a determination that process 700 is not complete, process 700 returns to 705.

Figure 8:
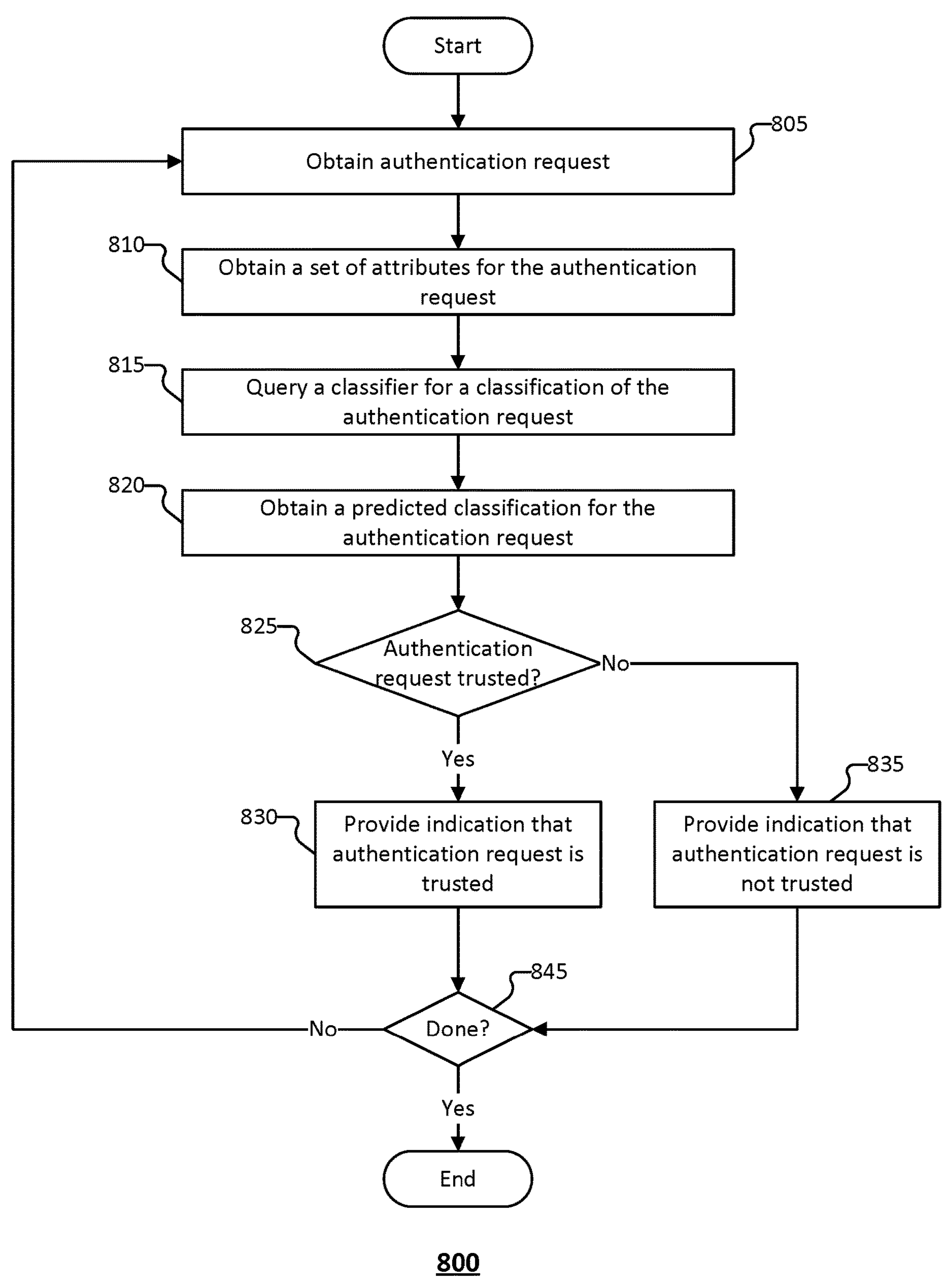
FIG. 8 is a flow diagram of a method for determining a classification for an authentication request according to various embodiments.

FIG. 8 is a flow diagram of a method for determining a classification for an authentication request according to various embodiments. In various embodiments, process 800 is implemented at least in part by system 100 of FIG. 1, system 200 of FIG. 2, and/or system 500 of FIG. 5.

In some implementations, process 800 may be implemented by one or more servers, such as in connection with providing a service to a network (e.g., a security entity and/or a network endpoint such as a client device). In some implementations, process 800 may be implemented by a security entity (e.g., a firewall) such as in connection with enforcing a security policy with respect to traffic sent across a network. For example, process 800 is implemented by a security entity that mediates traffic to an authentication service.

In some embodiments, process 800 is invoked in response to determining that a particular authentication request does not match a previously classified authentication request. For example, the system can query a blacklist or a whitelist of previously classified authentication requests and determine whether a particular authentication request matches a previously classified authentication request. In some embodiments, the system determines that a particular authentication request matches a previously classified authentication request based on one or more of (i) the authentication requests having the same signature/hash, (ii) the authentication requests having a same subset of attributes (e.g., a same source IP, or other set of attributes for which a classifier deems to be indicative of a certain classification such as trusted or untrusted), (iii) a determination that the respective set of attributes for the authentication requests are similar (e.g., have a similarity that exceeds a predefined similarity threshold), etc.

At 805, the system obtains an authentication request. The system may obtain the authentication request in connection with a process for classifying the authentication, such as obtaining a prediction of whether the authentication request is trusted or untrusted.

At 810, the system obtains a set of attributes for the authentication request. The set of attributes may include one or more of source IP address, firewall identifier, destination address (e.g., destination URL), source location (e.g., source geolocation), etc.

At 815, the system queries a classifier for a classification of the authentication request. The classifier may be a machine learning model. For example, the classifier is an XGBoost model. However, various other types of machine learning models may be implemented. Examples of types of machine learning models that can be implemented include XGBoost, a support vector machine (SVM) model, a decision tree model, a random forest model, etc.

At 820, the system obtains a predicted classification for the authentication request. For example, the system receives a response from the classifier. The response may be an indication of a likelihood that the authentication request is trusted (e.g., a valid request), or a likelihood that the authentication request is malicious or not trusted (e.g., an invalid request, or a part of a denial of service attack, etc.).

At 825, the system determines whether the authentication request is trusted. For example, the system determines whether the predicted classification indicates that the authentication request is trusted (e.g., that a predicted likelihood that the authentication request is trusted exceeds a predefined likelihood threshold).

In response to determining that the authentication request is trusted at 825, process 800 proceeds to 830 at which the system provide an indication that the authentication request is trusted. The system or other system/service to which the indication is provided can handle the authentication trust as being trusted, such as by causing the authentication service to process the authentication request.

In response to determining that the authentication request is not trusted at 825, process 800 proceeds to 835 at which the system provides an indication that the authentication request is not trusted. The system or other system/service to which the indication is provided can handle the authentication trust as being trusted, such as by causing the authentication request to be blocked, quarantined, deleted, etc.

At 840, a determination is made as to whether process 800 is complete. In some embodiments, process 800 is determined to be complete in response to a determination that no further authentication requests are to be handled, no further authentication requests are to be analyzed (e.g., no further authentication requests are to be classified), no further network traffic is received, an administrator indicates that process 800 is to be paused or stopped, etc. In response to a determination that process 800 is complete, process 800 ends. In response to a determination that process 800 is not complete, process 800 returns to 805.

Figure 9:
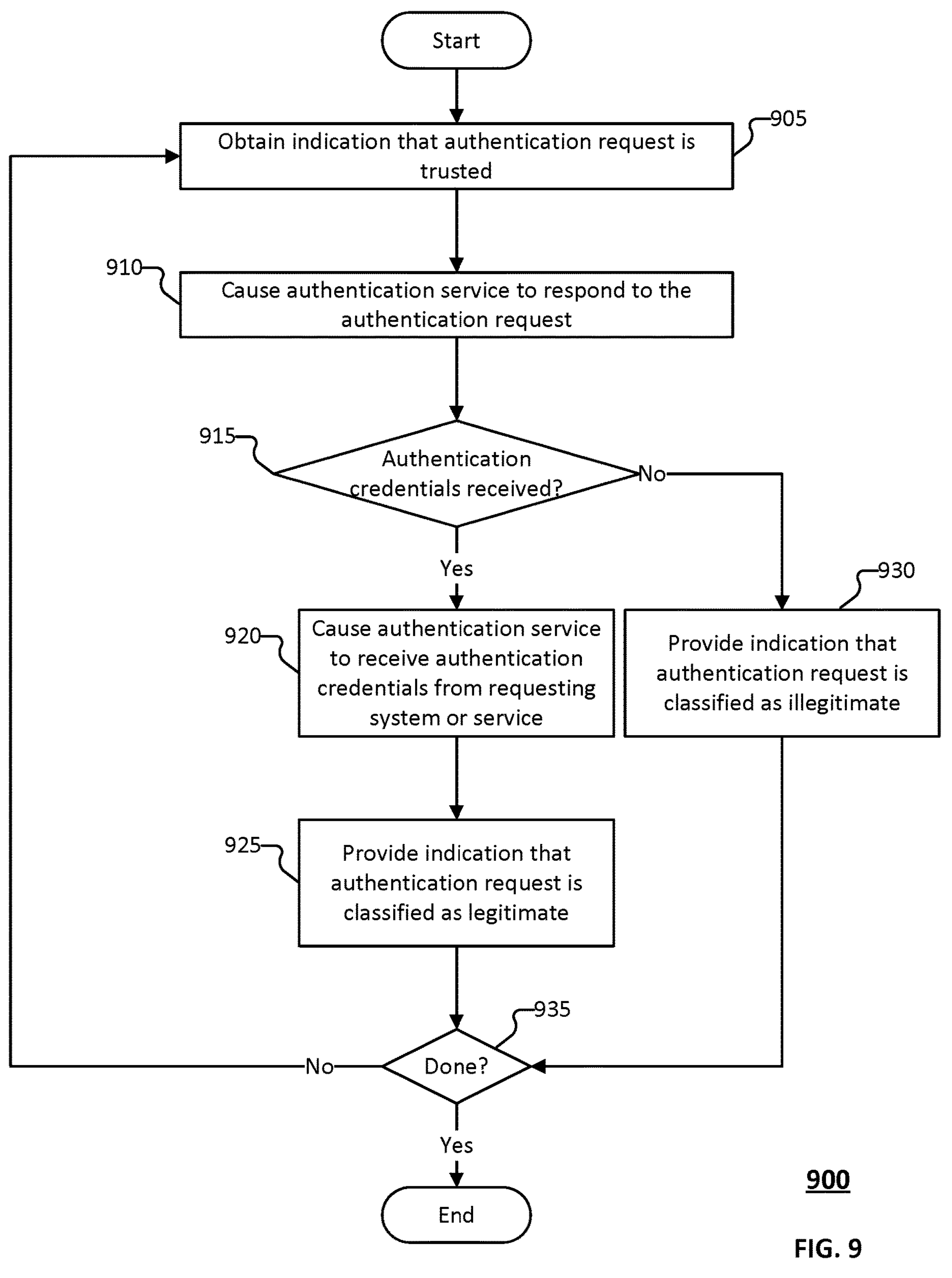
FIG. 9 is a flow diagram of a method for handling requests according to various embodiments.

FIG. 9 is a flow diagram of a method for handling requests according to various embodiments. In various embodiments, process 900 is implemented at least in part by system 100 of FIG. 1, system 200 of FIG. 2, and/or system 500 of FIG. 5. Process 900 may be invoked by process 700, such as at 715.

In some implementations, process 900 may be implemented by one or more servers, such as in connection with providing a service to a network (e.g., a security entity and/or a network endpoint such as a client device). In some implementations, process 900 may be implemented by a security entity (e.g., a firewall) such as in connection with enforcing a security policy with respect to traffic sent across a network. For example, process 900 is implemented by a security entity that mediates traffic to an authentication service.

At 905, the system obtains an indication that the authentication request is trusted. The system may obtain the indication that the authentication request is trusted (or at least an indication that the authentication service is to process the authentication request) in response to a classifier predicting that the authentication is trusted. For example, the classification for a particular authentication request (or requests matching a classified authentication request such as requests coming from the same source) can be reset after a predefined period of time. Upon resetting the classification, the system may permit an authentication request, which would previously have been classified as untrusted, to proceed to the authentication service for processing so the system can verify whether the authentication request is valid or invalid.

At 910, the system causes the authentication service to respond to the authentication request. For example, the proxy for the authentication service can forward the authentication request to the authentication service for processing.

At 915, the system determines whether authentication credentials are received. For example, the system determines whether the source of the authentication request is attempting to complete the authentication (e.g., rather than merely overwhelming the authentication service with authentication requests that are never processed/completed).

In response to determining that authentication credentials are received at 915, process 900 proceeds to 920 at which the system causes the authentication service to receive authentication credentials from the requesting system or service (e.g., the system from which the authentication request initiated). At 925, the system provides an indication that the authentication request is classified as legitimate. For example, in response to determining that the authentication credentials are received (e.g., within a threshold period of time), the system deems the authentication request to be legitimate.

In response to determining that authentication credentials are not received at 915, process 900 proceeds to 930 at which the system provides an indication that the authentication request is classified as illegitimate. The system may deem authentication requests to be invalid or illegitimate if no authentication credentials are received in connection with the authentication request (e.g., upon being challenged by the authentication service). In some embodiments, in response to determining that authentication credentials or a response to an MFA challenge is not received within a predefined period of time after the authentication service communicates an authentication challenge, the system deems the authentication request to have been invalid or malicious. For example, authentication requests for which no authentication credentials are communicated can correspond to malicious requests, such as requests sent in connection with a with a denial of service attack intended to overwhelm an authentication service and disrupting the authentication service's ability to provide service to legitimate users/requests.

At 935, a determination is made as to whether process 900 is complete. In some embodiments, process 900 is determined to be complete in response to a determination that no further authentication requests are to be handled, no further authentication requests are to be analyzed (e.g., no further authentication requests are to be classified), no further network traffic is received, an administrator indicates that process 900 is to be paused or stopped, etc. In response to a determination that process 900 is complete, process 900 ends. In response to a determination that process 900 is not complete, process 900 returns to 905.

Figure 10:
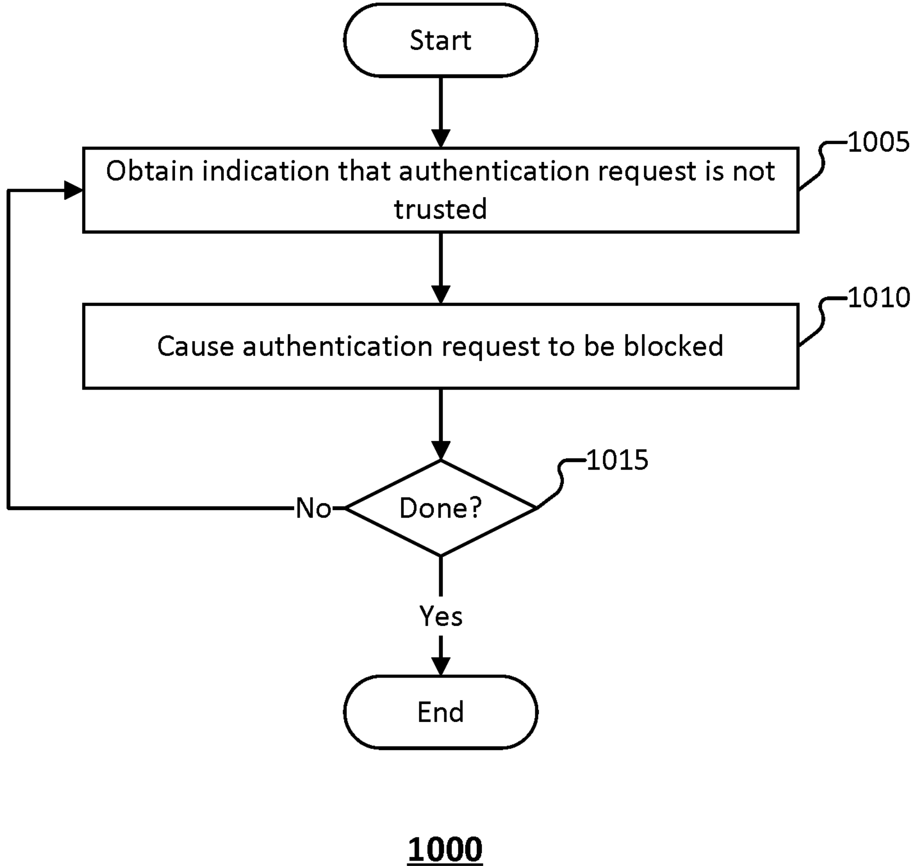
FIG. 10 is a flow diagram of a method for handling an untrusted authentication request according to various embodiments.

FIG. 10 is a flow diagram of a method for handling an untrusted authentication request according to various embodiments. In various embodiments, process 1000 is implemented at least in part by system 100 of FIG. 1, system 200 of FIG. 2, and/or system 500 of FIG. 5. Process 1000 may be invoked by process 700 (e.g., at 715).

In some implementations, process 1000 may be implemented by one or more servers, such as in connection with providing a service to a network (e.g., a security entity and/or a network endpoint such as a client device). In some implementations, process 1000 may be implemented by a security entity (e.g., a firewall) such as in connection with enforcing a security policy with respect to traffic sent across a network. For example, process 1000 is implemented by a security entity that mediates traffic to an authentication service.

At 1005, the system obtains an indication that the authentication request is not trusted. For example, the system obtains an indication that the authentication request is malicious or otherwise part of a denial of service attack. The system may obtain the indication that the authentication request in response to the system querying a classifier and the classifier predicting that the authentication request is malicious or not trusted. At 1010, the system causes the authentication request to be blocked. For example, the system causes the authentication service not to process the authentication request. At 1015, a determination is made as to whether process 1000 is complete. In some embodiments, process 1000 is determined to be complete in response to a determination that no further authentication requests are to be handled, no further authentication requests are to be analyzed (e.g., no further predictions for traffic, such as authentication requests, are needed), no further network traffic is received, an administrator indicates that process 1000 is to be paused or stopped, etc. In response to a determination that process 1000 is complete, process 1000 ends. In response to a determination that process 1000 is not complete, process 1000 returns to 1005.

Figure 11:
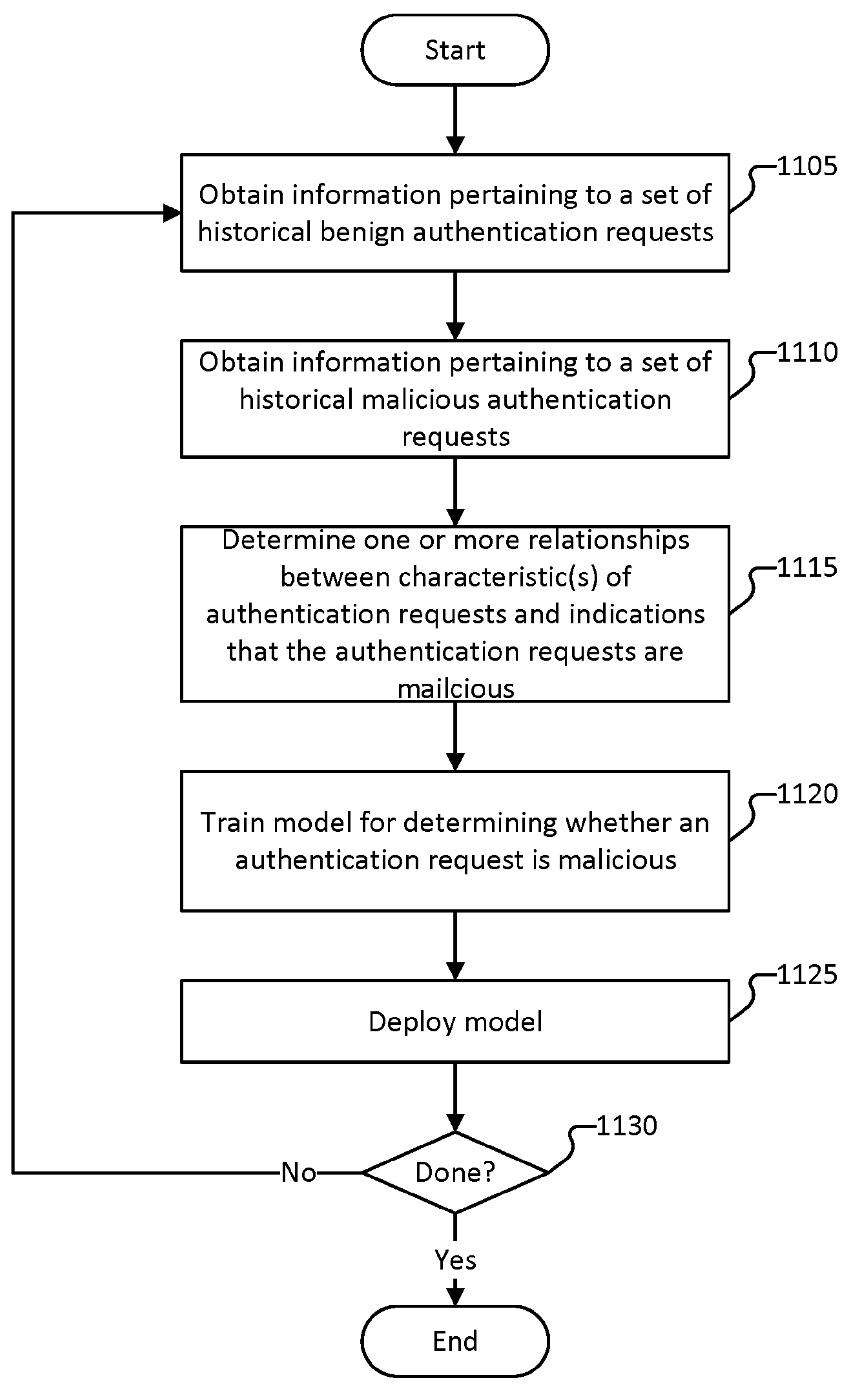
FIG. 11 is a flow diagram of a method for training a model for classifying authentication requests according to various embodiments.

FIG. 11 is a flow diagram of a method for training a model for classifying authentication requests according to various embodiments. In various embodiments, process 1100 is implemented at least in part by system 100 of FIG. 1, system 200 of FIG. 2, and/or system 500 of FIG. 5.

At 1105, the system obtains information pertaining to a set of historical benign authentication requests. In some embodiments, the system obtains the information pertaining to a set of historical benign samples from a third-party service (e.g., VirusTotal™). At 1110, the system obtains information pertaining to a set of historical malicious authentication requests. In some embodiments, the system obtains the information pertaining to a set of historical malicious samples from a third-party service (e.g., VirusTotal™). At 1115, the system determines one or more relationships between characteristic(s) of authentication requests and indications that the authentication requests are malicious samples. At 1115, a model is trained for determining whether an authentication request is malicious (e.g., a prediction of whether an authentication request is valid, or a prediction of whether the authentication request is part of a denial of service attack). In some embodiments, the model is trained to predict a classification for the authentication request, such as whether the authentication request is trusted (e.g., a valid authentication request) or whether the classification is untrusted (e.g., the authentication request is malicious or part of a denial of service attack, etc.). Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, XGBoost, etc. At 1125, the model is deployed. In some embodiments, the deploying of the model includes storing the model in a dataset of models for use in connection with analyzing traffic to determine whether the traffic is malicious (e.g., to predict classifications of authentication requests received at an authentication service). The deploying of the model can include providing the model (or a location/address at which the model can be invoked) to a malicious traffic detector, such as network traffic classifier 170 of system 100 of FIG. 1, or to system 200 of FIG. 2. At 1130, a determination is made as to whether process 1100 is complete. In some embodiments, process 1100 is determined to be complete in response to a determination that no further models are to be determined/trained (e.g., no further classification models are to be created), an administrator indicates that process 1100 is to be paused or stopped, etc. In response to a determination that process 1100 is complete, process 1100 ends. In response to a determination that process 1100 is not complete, process 1100 returns to 1105.

Figure 12:
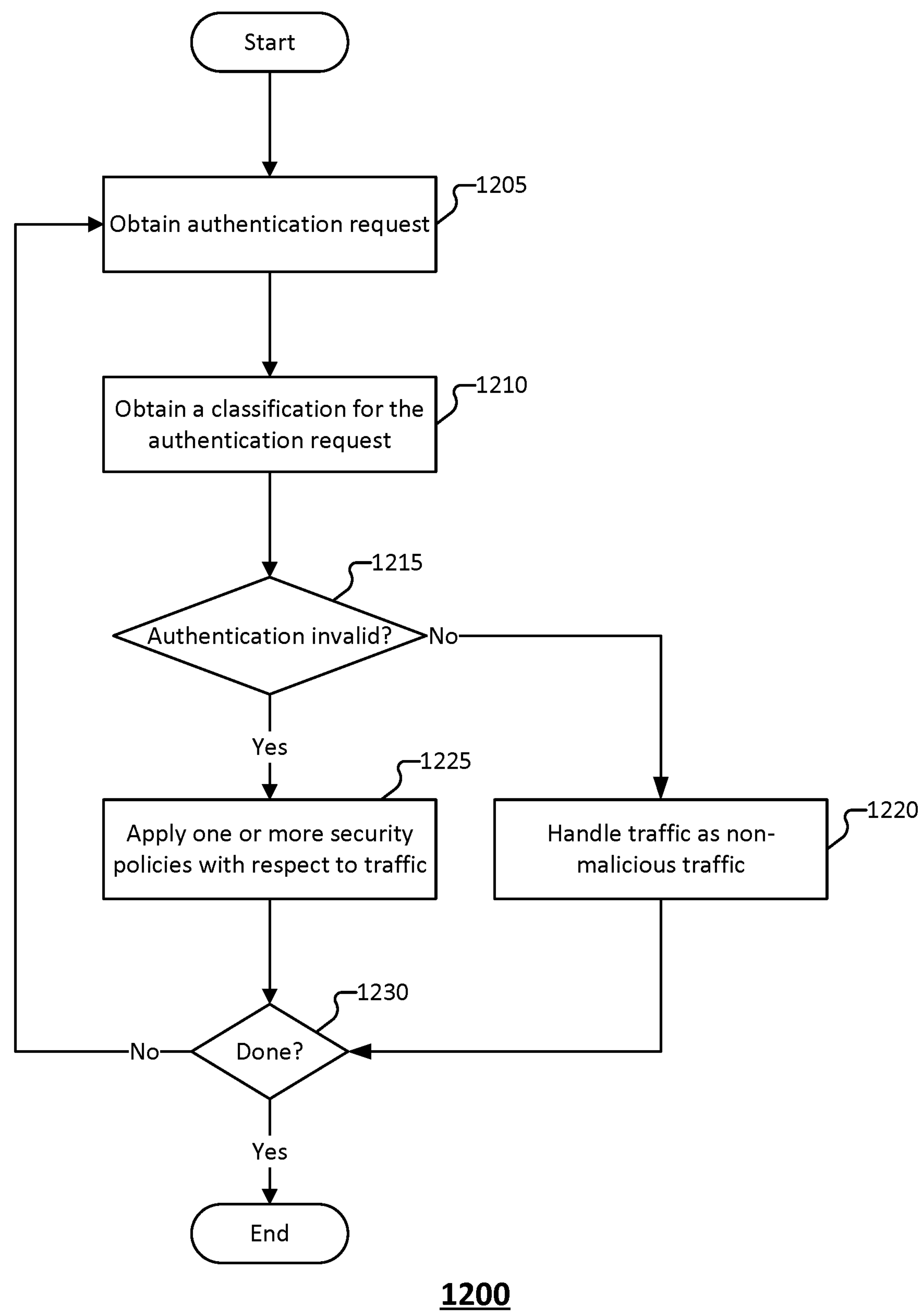
FIG. 12 is a flow diagram of a method for handling authentication requests according to various embodiments.

FIG. 12 is a flow diagram of a method for handling authentication requests according to various embodiments. In various embodiments, process 1200 is implemented at least in part by system 100 of FIG. 1, system 200 of FIG. 2, and/or system 500 of FIG. 5.

In some implementations, process 1200 may be implemented by one or more servers, such as in connection with providing a service to a network (e.g., a security entity and/or a network endpoint such as a client device). In some implementations, process 1200 may be implemented by a security entity (e.g., a firewall) such as in connection with enforcing a security policy with respect to files communicated across a network or in/out of the network.

In some embodiments, the system comprises a cloud service that provides near real-time traffic detection (e.g., a detection latency from the cloud service may be on the order of 10-50 ms).

At 1205, the system obtains a network traffic sample(s), such as authentication requests. The system may obtain network traffic sample(s) such as in connection with routing traffic within/across a network, or mediating traffic into/out of a network such as a firewall. For example, the system obtains the authentication request in connection with mediating traffic to an authentication service(s).

At 1220, the system obtains a classification for the network traffic sample. For example, the system determines whether the network traffic sample is malicious or benign. The system may obtain a classification for an authentication request, such as a prediction of whether the authentication request is trusted (e.g., a valid request for authentication) or untrusted (e.g., an invalid request or request sent as part of a denial of service attack).

In some embodiments, process 1200 invokes process 800 of FIG. 8 in connection with obtaining the classification.

According to various embodiments the system obtains a classification for the network traffic sample based at least in part on performing a look up against a blacklist (e.g., a mapping of malicious samples to signatures) and/or whitelist (e.g., a mapping of non-malicious or benign samples to signatures). The system can determine whether the network traffic sample (e.g., authentication requests sent from a particular proxy service or IP address, etc.) has been previously analyzed/classified. For example, in response to performing a classification, the system computes a signature (e.g., perform a hash based on a predefined hashing function) and stores the signature in association with the classification. The signature may be performed with respect to one or more attributes associated with an authentication request. The system may maintain a blacklist and/or whitelist for authentication requests, such as a mapping of IP addresses or proxies to indications of whether corresponding authentication requests are trusted or untrusted.

In some embodiments, the classification for a particular authentication request is reset for a threshold period of time. For example, in response to classifying an authentication request from a particular proxy service or source (e.g., a source IP address), the system deems all authentication requests from the particular proxy service or source as being untrusted for the threshold period of time. The threshold period of time may be predefined or dynamically determined, such as based on machine learning analysis. The threshold period of time may be 30 seconds, 1 minute, 4 minutes, 5 minutes, 10 minutes, 25 minutes, etc. Various other threshold periods of time may be implemented. In some embodiments, in response to the threshold period of time lapsing the system resets the classification for the authentication request (e.g., the classification of the set of attributes associated with the authentication request, such as an associated proxy or source). After resetting the classification, the system determines a new classification for subsequent authentication requests having the set of attributes. For example, in response to receiving a subsequent authentication request having the set of attributes, the system queries a classifier for a new predicted classification.

In some embodiments, the system determines whether the authentication request corresponds to a sample comprised in a set of previously identified benign samples such as a whitelist of benign samples. In response to determining that the authentication request is comprised in the set of samples on the whitelist of benign samples, the system determines that the sample is not malicious. Accordingly, the system permits the authentication request to be transmitted to, or processed by, an authentication service.

According to various embodiments, in response to determining the authentication request is not comprised in a set of previously identified malicious samples (e.g., a blacklist of malicious samples) or a set of previously identified benign samples (e.g., a whitelist of benign files), the system deems the authentication request as being non-malicious (e.g., benign) and handles the authentication request accordingly.

In some embodiments, in response to determining the authentication request is not comprised in a set of previously identified malicious samples (e.g., a blacklist of malicious samples) or a set of previously identified benign samples (e.g., a whitelist of benign samples), the system queries a classifier (e.g., a malicious traffic detector) for a prediction of whether the authentication request is trusted/untrusted. The system may quarantine the authentication request until the system receives response form the malicious traffic detector as to whether the authentication request is malicious. For example, the system prevents the transmission of the authentication request to the authentication service until the classification is generated and the classification is indicative of the authentication request being trusted. The malicious traffic detector may perform an assessment of whether the authentication request is malicious contemporaneous with the handling of the traffic by the system (e.g., in real-time with the receiving and transmission of authentication requests for an authentication service). The malicious traffic detector may correspond to network traffic classifier 170 of system 100 of FIG. 1 and/or system 200 of FIG. 2.

At 1215, the system determines whether the authentication request is invalid. For example, the system determines whether the classification of the authentication request indicates that the sample is invalid (e.g., untrusted or as part of a denial of service attack). As another example, the system determines whether the classification comprises a probability or likelihood that the sample is malicious that exceeds a predefined maliciousness threshold.

In response to a determination that the authentication request is valid at 1215, process 1200 proceeds to 1220 at which the traffic is handled as non-malicious traffic/information. For example, handling the traffic (e.g., the authentication request) includes transmitting the authentication request to the authentication service or otherwise cause the authentication service to process the authentication request.

In response to a determination that the authentication request is invalid at 1215, process 1200 proceeds to 1215 at which the traffic is handled as malicious traffic/information. The system may handle the authentication request deemed to be invalid based at least in part on one or more policies such as one or more security policies. As an example, the system can quarantine or otherwise block transmission of the authentication request to the authentication service.

According to various embodiments, the handling of the authentication request may include performing an active measure. The active measure may be performed in accordance (e.g., based at least in part on) one or more security policies. As an example, the one or more security policies may be preset by a network administrator, a customer (e.g., an organization/company) to a service that provides detection of malicious, or classification of authentication requests, etc. Examples of active measures that may be performed include: isolating the traffic (e.g., quarantining the traffic), deleting the traffic, prompting the user to alert the user that a malicious traffic was detected, blocking transmission of the traffic, updating a blacklist of malicious samples (e.g., a mapping of a hash or other signature for the authentication request to an indication that the authentication request is malicious, etc.).

At 1230, a determination is made as to whether process 1200 is complete. In some embodiments, process 1200 is determined to be complete in response to a determination that no further samples (e.g., authentication requests) are to be analyzed (e.g., no further predictions for traffic, such as authentication requests, are needed), no further network traffic is received, an administrator indicates that process 1200 is to be paused or stopped, etc. In response to a determination that process 1200 is complete, process 1200 ends. In response to a determination that process 1200 is not complete, process 1200 returns to 1205.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for adaptively limiting web requests, comprising:

one or more processors configured to:

receive a request at a proxy that mediates traffic between client systems and an authentication service;

determine whether the request is trusted based at least in part on a classification obtained from a classifier, wherein the classifier generates the classification based at least in part on whether credentials are returned by the requesting entity in response to an authentication challenge issued by the authentication service; and handle the request according to a determination of whether the request is trusted, wherein handling the request includes adaptively adjusting a rate at which authentication requests for the authentication service are processed by (i) rate-limiting requests classified as untrusted and (ii) prioritizing processing of requests classified as trusted, the adjusting being performed based at least in part on the classification that reflects the credential-return observation; and a memory coupled to the one or more processors and configured to provide the one or more processors with instructions.

2. The system of claim 1, wherein handling the request comprises processing the request in response to determining that the request is trusted.

3. The system of claim 1, wherein the classifier is a machine learning model.

4. The system of claim 1, wherein the classifier is trained based at least in part on XGBoost machine learning process.

5. The system of claim 1, wherein handling the request comprises blocking the request in response to determining that the request is untrusted.

6. The system of claim 1, wherein the classifier provides a binary classification of the request as either a trusted request or an invalid request.

7. The system of claim 1, wherein the request is deemed trusted in response to the classification predicting that the request is legitimate.

8. The system of claim 1, wherein the request is deemed untrusted in response to the classification predicting that the request is part of a distributed denial of service attack.

9. The system of claim 1, wherein if the request is deemed untrusted handling the request comprises returning an indication that the request will not be processed.

10. The system of claim 1, wherein the classifier generates a predicted classification based at least in part on one or more attributes associated with the request.

11. The system of claim 1, wherein handling the request according to a determination of whether the request is trusted comprises:

obtain an IP address associated with the proxy via which the request is sent; and configure a security entity to block requests associated with the IP address for a predefined period of time, wherein the predefined period of time is based on a security policy.

12. The system of claim 11, wherein the classification for the request is reset after the predefined period of time.

13. The system of claim 11, wherein requests from the IP address are re-classified after predefined period of time.

14. The system of claim 1, wherein handling the request according to the determination of whether the request is trusted comprises:

rate-limiting requests from the proxy based at least in part on determining that the classification for the request is indicative of the request being untrusted, wherein the rate-limiting is dynamic based on a probability score from the classification.

15. The system of claim 1, wherein the request is classified based at least in part on the request and a response to an authentication challenge.

16. The system of claim 15, wherein the response is a response to the authentication service for authenticating a user or device associated with the request.

17. The system of claim 1, wherein the predefined period of time for blocking requests associated with the IP address is dynamically determined based at least in part on a severity of the untrusted classification or a frequency of untrusted requests from the IP address.

18. The system of claim 1, wherein after the classification for the request is reset, the system is configured to forward a subsequent request from the same IP address to the authentication service to determine whether the subsequent request is legitimate or illegitimate based on whether credentials are returned in response to an authentication challenge for the subsequent request.

19. The system of claim 1, wherein the system is configured to:

after the predefined period of time for blocking requests associated with the IP address has expired, reset the classification associated with the IP address; and forward a subsequent request from the same IP address to the authentication service to determine whether the subsequent request is legitimate or illegitimate based on whether credentials are returned by the requesting entity in response to an authentication challenge issued by the authentication service for the subsequent request.

20. The system of claim 1, wherein:

the adaptive adjustment of the rate at which authentication requests are processed is performed dynamically based on a probability score output by the classifier, the probability score reflecting the likelihood that credentials will be returned in response to an authentication challenge; and the system rate-limits authentication requests having a probability score below a predetermined threshold while prioritizing and forwarding authentication requests having a probability score above the predetermined threshold.

21. A method for adaptively limiting web requests, comprising:

receiving a request at a proxy that mediates traffic between client systems and an authentication service;

determining whether the request is trusted based at least in part on a classification obtained from a classifier, wherein the classifier generates the classification based at least in part on whether credentials are returned by the requesting entity in response to an authentication challenge issued by the authentication service; and handling the request according to a determination of whether the request is trusted, wherein handling the request includes adaptively adjusting a rate at which authentication requests for the authentication service are processed by (i) rate-limiting requests classified as untrusted and (ii) prioritizing processing of requests classified as trusted, the adjusting being performed based at least in part on the classification that reflects the credential-return observation.

22. A computer program product embodied in a non-transitory computer readable medium for adaptively limiting web requests, and the computer program product comprising computer instructions for:

receiving a request at a proxy that mediates traffic between client systems and an authentication service;

determining whether the request is trusted based at least in part on a classification obtained from a classifier, wherein the classifier generates the classification based at least in part on whether credentials are returned by the requesting entity in response to an authentication challenge issued by the authentication service; and handling the request according to a determination of whether the request is trusted, wherein handling the request includes adaptively adjusting a rate at which authentication requests for the authentication service are processed by (i) rate-limiting requests classified as untrusted and (ii) prioritizing processing of requests classified as trusted, the adjusting being performed based at least in part on the classification that reflects the credential-return observation.

23. A system for training a classifier for adaptively limiting web requests, comprising:

one or more processors configured to:

obtain a set of requests at a proxy for an authentication service;

train a classifier based at least in part on the set of requests, wherein the classifier is configured to identify legitimate requests to the proxy for the authentication service; and deploy the classifier in connection with adaptively limiting requests to the proxy for the authentication service based on one or more classifications predicted by the classifier;

wherein:

the classifier generates a particular classification based at least in part on whether credentials are returned in response to an authentication challenge for a particular request; and the adaptively limiting comprises adjusting a rate at which authentication requests are processed based at least in part on the one or more classifications predicted by the classifier; and a memory coupled to the one or more processors and configured to provide the one or more processors with instructions.

24. The system of claim 23, wherein the set of requests are obtained based on a log of requests at the authentication service.

25. The system of claim 23, wherein the set of requests correspond to past authentication requests.

* * * * *